(12) United States Patent
Sun et al.

(10) Patent No.: US 7,416,598 B2
(45) Date of Patent: Aug. 26, 2008

(54) ADHESIVES FROM MODIFIED SOY PROTEIN

(75) Inventors: Susan Sun, Manhattan, KS (US);
Donghai Wang, Manhattan, KS (US);
Zhikai Zhong, Manhattan, KS (US);
Guang Yang, Shanghai (CN)

(73) Assignee: Kansas State University Research Foundation, Manhattan, KS (US)

( * ) Notice: Subject to any disclaimer, the term of this patent is extended or adjusted under 35 U.S.C. 154(b) by 159 days.

(21) Appl. No.: 11/028,013

(22) Filed: Jan. 3, 2005

(65) Prior Publication Data

US 2005/0166796 A1    Aug. 4, 2005

Related U.S. Application Data

(60) Provisional application No. 60/533,782, filed on Dec. 31, 2003.

(51) Int. Cl.
*C08L 89/00* (2006.01)

(52) U.S. Cl. ............. 106/127.1; 106/132.2; 106/148.1; 106/156.2

(58) Field of Classification Search ............ 106/127.1, 106/132.2, 148.1, 156.2
See application file for complete search history.

(56) References Cited

U.S. PATENT DOCUMENTS 5,523,293 A *  6/1996  Jane et al. ............... 514/21
6,497,760 B2 * 12/2002  Sun et al. ............... 106/131.1

* cited by examiner

*Primary Examiner*—Elizabeth D. Wood
(74) *Attorney, Agent, or Firm*—Tracey S Trutt

(57) ABSTRACT

The, present invention provides useful adhesive compositions having similar adhesive properties to conventional UF and PPF resins. The compositions generally include a protein portion and modifying ingredient portion selected from the group consisting of carboxyl-containing compounds, aldehyde-containing compounds, epoxy group-containing compounds, and mixtures thereof. The composition is preferably prepared at a pH level at or near the isoelectric point of the protein. In other preferred forms, the adhesive composition includes a protein portion and a carboxyl-containing group portion.

24 Claims, 7 Drawing Sheets

ADHESIVES FROM MODIFIED SOY PROTEIN

RELATED APPLICATIONS

This application claims the benefit of provisional application Ser. No. 60/533,782, filed on Dec. 31, 2003, the teachings and content of which are incorporated by reference herein.

STATEMENT REGARDING FEDERALLY SPONSORED RESEARCH OR DEVELOPMENT

This invention was made with government support of the U.S. Department of Energy under contract number DE-FC07-011D14217. The government has certain rights in the invention.

BACKGROUND OF THE INVENTION

1. Field of the Invention

The present invention is concerned with adhesives made from vegetable or grain proteins. More particularly, the present invention is concerned with such adhesives wherein the adhesives have been combined with an ingredient and/or pH level that modifies the adhesive's properties. Still more particularly, the present invention is concerned with adhesives that have been modified with an ingredient containing at least one carboxyl group, and/or at least one aldehyde group, and/or at least one epoxy group. Still more particularly, the modified adhesive will be used near the isoelectric point of the protein used therein.

2. Description of the Prior Art

It is estimated that demand for adhesives in the US will reach 15.2 billion pounds in 2004. Up to 60% of these adhesives are used in the wood industry for plywood, particle board, and furniture applications. Most of these adhesives, including hot melt, emulsion, vinyl-based, rubber-based, acrylics, phenolic, amino, epoxy, and silicone adhesives, are from petroleum resources. Urea formaldehyde (UF), having a typical wet strength of 3.5 MPa, 70% wood failure, and 0 MPa boiling strength, and phenol formaldehyde (PF), having a typical wet strength of 3.5 Mpa with 81% wood failure, and 2.7 MPa boiling strength with 72% wood failure, are commonly used conventional adhesives. However, concerns have been raised in recent years about naturally limited petroleum resources, environmental pollution, and health problems caused by manufacturing, transportation, storage, and utilization of those petroleum-based adhesives. Accordingly, development of environmentally friendly adhesives from renewable resources is becoming increasingly important.

Soy protein has great potential to be an alternative to the petroleum-based adhesives because of its abundance, renewability, and biodegradability. Soy based adhesives were first developed around 1923 when a patent was granted for a soy meal-based glue. However, soy protein adhesives have suffered from low gluing strength and low water resistance. In recent years, some efforts have been made to improve their adhesion strength and water resistance. Hettiarachchy et al. used an alkali-modification method and obtained adhesives with improvement in both characteristics. Sun and Bian found that urea-modified soy protein adhesives were more water-resistant than those modified by alkali. Other modification agents included trypsin, guanidine hydrochloride (GuHCl), sodium dodecyl sulfate (SDS), sodium dodecylbenzene sulfonate, and 1,3-dichloro-2-propanol (DCP) [2,6-8]. The DCP was believed to form epichlorohydrin under alkali conditions that could further react with amino, hydroxyl, and carboxyl groups. GuHCl and SDS were also used to modify soy protein adhesive for fiberboard application. Li et al used a cationic polymer, polyamide-epichlorohydrin (PAE), to cross-link soy protein and got improved adhesion strength and water resistance. The improved properties were attributed to chemical reactions between PAE and soy protein at elevated temperature. PAE is a well-known wet-strength resin, which is widely used in paper and pulp industry. It is prepared by reaction of water-soluble polyamide with epichlorohydrin, to form water-soluble, cationic polymer with reactive azetidinium groups. The azetidinium group can react with active-hydrogen groups, such as carboxyl, hydroxyl, and amino functional groups. These reactions can increase water resistance by forming an insoluble network coating around surface and by forming cross-linkages between resin and substrate.

Accordingly, what is needed in the art is an adhesive derived from a renewable source, which has adhesion and water resistance properties comparable to conventional petroleum-based adhesives, and methods of making the same. What is further needed is a protein-based adhesive that has similar water resistance and adhesion properties as conventional petroleum-based adhesives, and methods of making the same. What is further needed are adhesives derived from vegetable or grain proteins that have been modified to increase their adhesive strength and water resistance, and methods of making the same. Finally, what is needed are vegetable protein based adhesives modified with compounds containing carboxyl groups, and/or aldehyde groups, and/or epoxy groups, wherein the adhesive is prepared at or near the isoelectric point of the vegetable protein.

SUMMARY OF THE INVENTION

The present invention overcomes the problems outlined above and provides improved protein based adhesives and methods of making the same. The protein is preferably a vegetable or grain protein selected from the group consisting of corn protein, wheat protein, soy protein, fractions thereof, and combinations thereof or proteins containing a similar chemical composition as the vegetable or grain proteins mentioned above. For ease of use, soy protein or its fractions are preferred. Preferred soy protein fractions include glycinin and conglycinin. Protein subunits such as the 7S and 11S subunits of soy protein are a part of the protein fractions referred to herein. It is understood by those of skill in the art that when corn protein is selected, alcohol may be necessary for preparing the composition of the invention. Up to 99% of the adhesive composition may be made up of the vegetable protein. More preferably, the amount of protein in the composition is about 55-99%, still more preferably between 80-99%, and even more preferably between 90-99%. The protein portion of the composition will preferably have a solids content between about 5-20%, more preferably about 8-15%, and still more preferably about 12%.

Preferably, the composition will also contain a modifying ingredient selected from the group consisting of carboxyl-containing compounds, aldehyde-containing compounds, epoxy group-containing compounds, and combinations thereof. Up to 20% of the composition can be the modifying ingredient. When carboxyl-containing compounds are used, they should be present in an amount up to 20%, more preferably between about 0.5-10%, more preferably between about 0.5-5%, still more preferably between about 0.75-3%, still more preferably between about 0.9% and 1.2%, and most preferably about 1%. When aldehyde-containing compounds are included, they should be present in an amount between 1 to 20%, more preferably between 1-10%, even more preferably between 2-9%, still more preferably between 3-8%,. even more preferably between 3.75-7%, still more preferably between 4.25-6%, and most preferably about 5%. When epoxy-containing compounds are used, the epoxy compound content of the composition will preferably be between 1-20%, more preferably between 1-15%, even more preferably between 3-15%, still more preferably between 5-13%, even more preferably between 7-12%, still more preferably between 9-11%, and most preferably about 10%.

In preferred forms, the ingredient portion is selected from the group consisting of sodium silicate solution, hexamethylenetetramine, carbon disulfide, borax, zinc salts such as $ZnSO_4$, copper salts such as $CuSO_4$, PAE, epoxy resins or compounds containing epoxy groups (including epoxidized soybean oil and various aliphatic epoxy resins), acids including citric acid, succinic acid, malic acid, tartaric acid, 1,2,3-propanetricarboxylic acid (TCA), and 1,2,3,4-butanetetracarboxylic acid, carboxyl methyl cellulose, formaldehyde, acetaldehyde, phenoxy acetaldehyde, dialdehyde starch, and bases. Sodium silicate solution (SSS) helps to stabilize modified protein structure for a longer adhesive working life and to improve water resistance of the cured adhesive film by forming some insoluble proteinates. Sodium borate, or borax, is similar to caustic soda. Both sodium silicate solution and sodium borate make the adhesive slurry alkaline. Preferred ranges of SSS for use in the present invention are from about 0% to about 20%, more preferably from about 1% to about 15%, more preferably from about 3% to about 10%, still more preferably from about 4% to about 6%, and most preferably about 5%. Hexamethylenetetramine (hexa) is an aldehyde compound, considered as a cross-linking agent, which can react with amino groups of protein. Preferred ranges of hexa for use in the present invention are from about 0% to about 20%, more preferably from about 2.5% to about 18%, still more preferably from about 3% to about 15%, and most preferably from about 5% to about 10%. Zinc sulfate ($ZnSO_4$) is also a cross-linking agent, which is expected to interact with carboxyl anions under alkaline condition. Preferred ranges of zinc sulfate are from about 0% to about 20%, more preferably from about 3% to about 15%, more preferably from about 5% to about 10%, with 5% being particularly preferred. Therefore, both Hexa and zinc sulfate may improve strength and water resistance.

Citric acid including citric acid monohydrate contains many carboxyl groups that are expected to interact with both proteins and cellulosic based materials at elevated temperatures. Preferred ranges of citric acid for use in use the present invention are from about 0% to about 10%, more preferably from about 1% to about 5%, and most preferably from about 1% to about 3%. Tricarballylic acid contains three carboxyl groups per molecules that are expected to react with hydroxyl and amino groups of SPI. Preferred ranges of tricarballylic acid for use in use the present invention are from about 0% to about 10%, more preferably from about 1% to about 5%, and most preferably from about 1% to about 3%. 1,2,7,8-diepoxyoctane contains epoxy groups that may have potential reacting with some amino groups of SPI. Preferred ranges of 1,2,7,8-diepoxyoctane for use in the present invention are from about 0% to about 50%, more preferably from about 5% to about 30%, and most preferably from about 10% to about 20%. When ESO is present, it is used in an amount from 0% to about 50%, more preferably from about 5% to about 30%, and most preferably from about 10% to about 20%. When PAE is used, it should be present in an amount up to 20%, more preferably between 1% to 10%, still more preferably between about 2% and 8%, still more preferably between about 3% and 7%, even more preferably between about 4% and 6%, and most preferably about 5%.

The pH of the composition also has profound effect on the adhesive and water resistance properties of the composition. It was unexpectedly found that the pH of the composition should be based on the isoelectric point of the protein used. For soy protein, this is typically in the range of about 3.6 to about 6.5. For corn protein, the pH level at the isoelectric point is between about 9.0 to 11.5, and more preferably about 10.6. Isoelectric points of other vegetable and grain proteins as well as fractions thereof are easily found or determined by those of skill in the art. Accordingly, improved methods of making vegetable or grain protein-based adhesives are provided wherein the isoelectric point of the protein portion is determined and the pH of the composition is adjusted to or near this pH. This is based on the fact that proteins exhibit very different surface structure, surface charges and distribution, and structure conformation in different pH environments. For example, at its isoelectric point, soy protein has the lowest water solubility and becomes more water resistant. The cross linked soy proteins of the present invention provide increased water resistance. Additionally, heat-improved protein unfolding, entanglement, and interaction with other functional groups is also enhanced at or near the isoelectric point of the protein used to form the adhesive.

The principle of protein gluing is that the protein molecules disperse and unfold in solution. The unfolded molecules increase the contact area and adhesion onto other surfaces, and the unfolded molecules become entangled with each other during the curing process to retain bonding strength. Some of the mechanisms mentioned above may apply to the adhesion between protein and cellulosic materials, such as wood. Both protein and wood contain many hydroxyl groups that will form hydrogen bounding at the interface or macromolecular interactions between proteins and wood surface. When proteins with compacted structures become unfolded in solution, they may more easily form mechanical locking with the rough surface of wood during curing.

Proteins are complex macromolecules that contain a number of chemical linked amino acid monomers, which together form polypeptide chains, constituting the primary structure. The α helix and β sheet patterns of the polypeptide chains are called secondary structure. A number of side chains are connected to these amino acid monomers, and they interact each other mainly through hydrogen and disulfide bonds forming tertiary, or quaternary structures. Proteins can be modified by using physical, chemical, and enzymatic methods, which result in structural or conformational changes from native structure without alteration of the amino acid sequence. Modifications that change the secondary, tertiary, or quaternary structure of a protein molecule have been referred to as denaturation. The compact protein structure becomes unfolded during denaturation, which is accompanied by breaking and re-forming of the intermolecular and intramolecular interactions. Protein modification could increase the tendency to unfold and, consequently, increase the bonding strength. Protein modification also could move some hydrophobic amino acids, which are buried inside, outwards to increase water resistance.

Protein structure changes at the secondary, third, or quaternary level can be induced by pH (alkali and acid), detergents, urea, guanidine hydrochloride, cross-linkers, chemicals with functional groups that can react with protein side chains, among others, as well as by heat treatment. The degree of change is influenced not only by modifier chemical structure, but also by chemical concentration and modification procedures.

In addition, proteins are temperature and pressure sensitive polymers. Curing temperature, pressure, and time are important parameters influencing the final protein structure re-conformation, mutual diffusion at the interface, and consequently, the adhesion strength. The structure change induced by modification requires different curing conditions.

As used herein, "isoelectric point" of a protein refers to the pH level at which negatively charged groups of the protein are evenly balanced with positively charged groups of the protein such that the protein has a net charge of zero. Moreover, when the pH of a solution or composition in accordance with this invention is referred to as being "near" the isoelectric point of the vegetable or grain protein, said pH is within ±0.2 of the isoelectric point of the protein. For example, the isoelectric point of soy protein is approximately 4.5; a solution near this isoelectric point would be between 4.3-4.8. More preferably the pH is within ±0.1, and still more preferably within 0.05 of the isoelectric point.

DETAILED DESCRIPTION OF THE PREFERRED EMBODIMENTS

Figure 1:
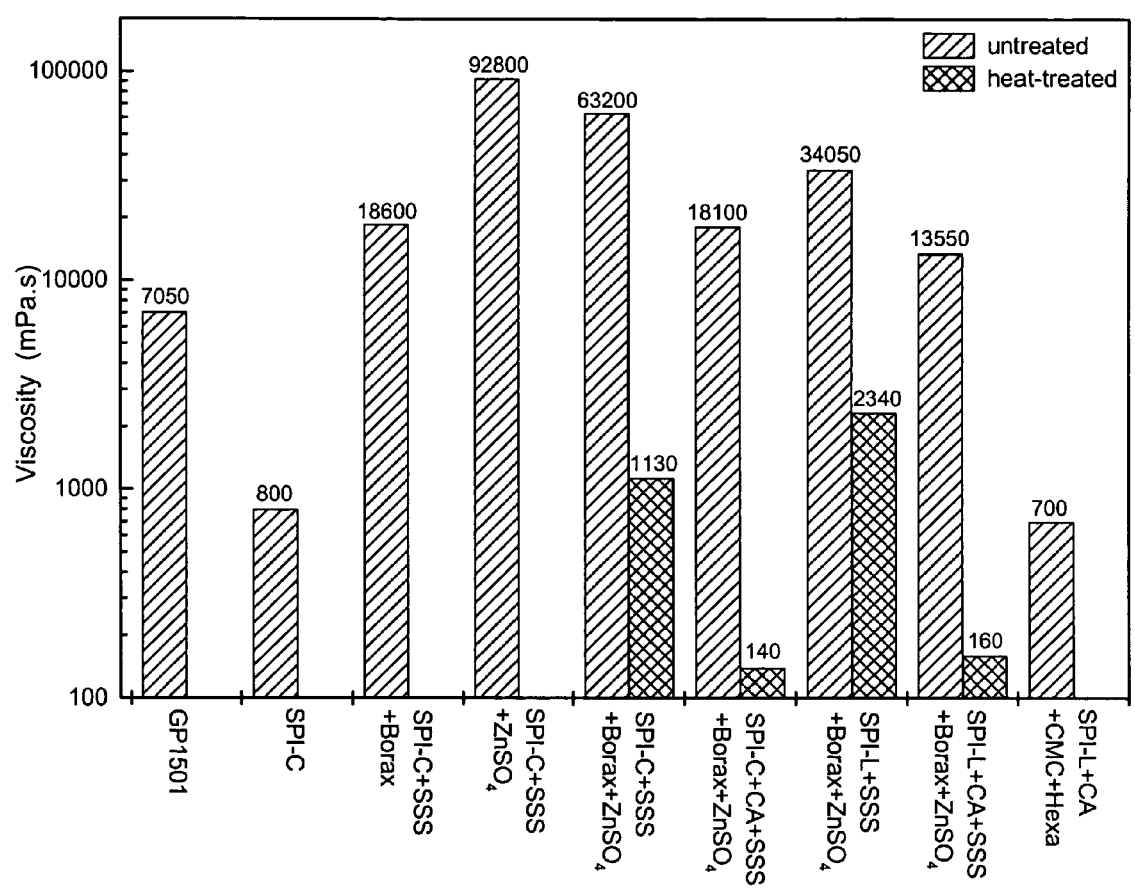
FIG. 1 is a graph illustrating the viscosities of protein-based adhesives in accordance with the present invention.

The following examples set forth preferred adhesives and procedures in accordance with the present invention. It is to be understood, however, that these examples are provided by way of illustration only, and nothing therein should be deemed a limitation upon the overall scope of the invention.

EXAMPLE 1

This Example compared the adhesive properties and strengths of soy protein adhesives modified with sodium silicate solution, hexamethylenetetramine, zinc sulfate, sodium borate, and combinations of these modifiers.

Materials, Methods, and Results

Twenty adhesive samples were created in the following manner. 3.6 grams of soy protein isolate ("SPI") provided by Archer Daniels Midland (PRO-Fam 970, Decatur, Ill.) was suspended in 30 g distilled water and stirred until a homogeneous, lump-free slurry was obtained. The SPI solid concentration was about 12% unless otherwise noted. After obtaining the slurry, Sample A was unmodified. Sample B was modified by adding a sodium silicate solution comprising 14% NaOH and 27% $SiO_2$ ("SSS") to the slurry until it was 5% of the solution as compared to the solid weight of the SPI. Sample C was modified by adding 5% SSS and 5% hexamethylenetetramine ("hexa") to the slurry. Sample D was modified by adding 5% SSS and 5% zinc sulfate ($ZnSO_4.7H_2O$). Sample E was modified by adding 5% SSS and 3% sodium borate ($Na_2B_4O_7.10H_2O$). Sample F was modified by adding 5% hexa and 5% zinc sulfate. Sample G was modified by adding 5% hexa, 5% SSS, and 5% zinc sulfate. Sample H was modified by adding 5% SSS, 3% sodium borate, 5% hexa, and 5% zinc sulfate. Sample I was a conventional phenolformaldehyde adhesive (GP5101, Georgia Pacific Resin, Inc., Decatur, Ga.) used for comparison purposes. Sample J was an SPI modified by adding 7% SSS, 3% sodium borate, 5% hexa, and 5% zinc sulfate. Sample K was modified by adding 5% SSS, 3% sodium borate, 5% hexa, and 5% zinc sulfate. Sample L was modified by adding 3% SSS, 3% sodium borate, 5% hexa, and 5% zinc sulfate. Sample M was modified by adding 1% SSS, 3% sodium borate, 5% hexa, and 5% zinc sulfate. Sample N was modified by adding 3% sodium borate, 5% hexa, and 5% zinc sulfate. Sample 0 was modified by creating a slurry in a manner similar to Sample K except that 7% of the adhesive was SPI. Sample P was modified by adding 2% zinc sulfate, 5% SSS, 3% sodium borate, and 5% hexa. Sample Q was modified by adding 1% zinc sulfate, 5% SSS, 3% sodium borate, and 5% hexa. Sample R was modified by adding 2.5% hexa and 5% SSS. Sample S was modified by adding 5% hexa and 5% SSS. Sample T was modified by adding 10% hexa and 5% SSS. All modifications were conducted at room temperature for 10 minutes.

The samples were tested using cherry wood provided by Veneer One (Oceanside, N.Y.) as an adherent. Each wood sample was 50 mm×127 mm by 3 mm. Each of the adhesive samples was applied to each end of two pieces of the wood samples with about a 127 mm×20 mm area. The wood samples with adhesives were allowed to rest for about 15 minutes at room temperature at about 50% relative humidity. They were then pressed together at 130° C., 1.4 MPa for 5 minutes. Two other wood samples received the same treatment with a commercial phenol formaldehyde resin provided by Georgia Pacific Resin, Inc. (Decatur, Ga.), with the exception that these wood samples were pressed at 160° C. Each glued sample was then preconditioned at 23° C. at 50% relative humidity for 48 hours, after which each was cut into five testing specimens. The testing specimens were then preconditioned at 23° C. at 50% relative humidity for five days.

After the preconditioning of the testing specimens was complete, the strength of unsoaked samples a testing specimen from each sample was determined using an Instron machine (Model 4465, Canton, Mass.) following the test procedure ASTM D2339.

Water resistance was tested by using ASTM D1151 and D 1183. Soaked sample results were obtained by soaking test specimens in tap water at 23° C. for 48 hours, then drying them at 23° C. and 50% relative humidity for 7 days before testing them.

Wet strength was tested by soaking test specimens in tap water at 23° C. for 48 hours, then performing the strength test immediately.

Wood failure for each of the above specimens was evaluated according to ASTM D5266.

Results for the above tests are provided in Tables 1-4, below:

TABLE 1

| Sample | Shear Strength | | |
|---|---|---|---|
| | Unsoaked Sample | Soaked Sample | Wet Strength |
| A | 4.8 ± 0.24 CFW: 39 | 4.3 ± 0.62 CFW: 54 | 1.6 ± 0.22 CFW: 5 |
| B | 5.1 ± 0.90 CFW: 70 | 4.5 ± 0.68 CFW: 43 | 1.9 ± 0.26 CFW: 11 |
| C | 5.7 ± 0.71 CFW: 100 | 4.8 ± 0.83 CFW: 94 | 2.8 ± 0.28 CFW: 19 |
| D | 5.4 ± 0.64 CFW: 94 | 5.2 ± 0.97 CFW: 94 | 2.8 ± 0.21 CFW: 47 |
| E | 5.1 ± 0.63 CFW: 54 | 4.4 ± 0.45 CFW: 36 | 1.2 ± 0.24 CFW: 7 |
| F | 5.3 ± 0.57 CFW: 70 | 5.5 ± 0.14 CFW: 80 | 2.6 ± 0.17 CFW: 41 |
| G | 5.8 ± 0.92 CFW: 76 | 5.6 ± 1.08 CFW: 55 | 3.4 ± 0.34 CFW: 30 |
| H | 4.9 ± 0.68 CFW: 98 | 5.2 ± 0.51 CFW: 94 | 3.2 ± 0.18 CFW: 61 |
| I | 4.6 ± 0.46 CFW: 100 | 4.7 ± 0.66 CFW: 100 | 3.5 ± 0.30 CFW: 52 |

TABLE 2

| Sample | Shear Strength | | |
|---|---|---|---|
| | Unsoaked Sample | Soaked Sample | Wet Strength |
| J | 4.4 ± 0.18 CFW: 100 | 4.83 ± 0.31 CFW: 92 | 2.2 ± 0.35 CFW: 36 |
| K | 4.9 ± 0.68 CFW: 98 | 5.2 ± 0.34 CFW: 94 | 3.2 ± 0.37 CFW: 61 |
| L | 4.7 ± 0.19 CFW: 100 | 4.1 ± 0.77 CFW: 94 | 2.3 ± 0.18 CFW: 36 |
| M | 4.5 ± 0.49 CFW: 100 | 4.8 ± 0.37 CFW: 89 | 2.4 ± 0.35 CFW: 24 |
| N | 4.8 ± 0.79 CFW: 66 | 4.8 ± 0.47 CFW: 90 | 2.2 ± 0.31 CFW: 25 |

TABLE 3

| Sample | Shear Strength | | |
|---|---|---|---|
| | Unsoaked Sample | Soaked Sample | Wet Strength |
| O | 4.9 ± 0.26 CFW: 81 | 4.3 ± 0.34 CFW: 83 | 1.2 ± 0.17 CFW: 7 |
| P | 5.6 ± 0.41 CFW: 100 | 5.3 ± 0.52 CFW: 99 | 2.1 ± 0.17 CFW: 28 |
| Q | 4.4 ± 0.18 CFW: 100 | 4.8 ± 0.52 CFW: 93 | 2.4 ± 0.18 CFW: 19 |

TABLE 4

| Sample | Shear Strength | | |
|---|---|---|---|
| | Unsoaked Sample | Soaked Sample | Wet Strength |
| R | 5.4 ± 0.24 CFW: 38 | 4.7 ± 1.03 CFW: 34 | 1.7 ± 0.59 CFW: 5 |
| S | 5.7 ± 0.71 CFW: 100 | 4.9 ± 0.83 CFW: 94 | 2.8 ± 0.28 CFW: 19 |
| T | 5.3 ± 0.70 CFW: 79 | 5.0 ± 0.83 CFW: 72 | 2.4 ± 0.18 CFW: 18 |

Discussion

The SSS was added in order to help stabilize the modified protein structure and viscosity. This should help to lead to a longer working life and to improve water resistance of the cured adhesive by forming some insoluble proteinates. Sodium borate, along with the SSS, helps to make the adhesive slurry alkaline. Hexa is a cross-linking agent which can react with amino groups of the SPI. Zinc sulfate is also a cross-linking agent which is expected to interact with carboxyl anions under alkaline conditions. Accordingly, both hexa and zinc sulfate can improve strength and water resistance.

Table 1 is focused on the different modifiers for SPI adhesives. Sample H, in particular, which is SPI modified with 5% SSS, 3% sodium borate, 5% hexa, and 5% zinc sulfate, showed the highest wet strength and wood failure, and compares favorably in these parameters to conventional phenol-formaldehyde adhesives (Sample I)

Table 2 is focused on examining deferring or declining SSS concentrations, and demonstrates that a 5% SSS concentration (Sample K) yields higher wood failures for wet and soaked samples than other concentrations.

Table 3 is focused on examining different zinc sulfate concentrations. Sample P, a 2% zinc sulfate concentration, showed the highest wood failure, but Sample O had a lower SPI concentration. Comparing Sample P with sample H (in table 1), which has the same SPI concentration and a 5% zinc sulfate yields higher wet strength and wood failure.

Table 4 is focused on deferring or declining concentrations of hexa, and demonstrates that 5% hexa concentration (Sample S) yields the highest adhesive strength and wood failure.

EXAMPLE 2

This Example tested the effects of viscosity-modifying ingredients on adhesives in accordance with the present invention.

Material, Methods, and Results

Three adhesive samples were prepared using the method described in Example 1. Sample A was a soy protein isolate modified with 5% SSS, 3% sodium borate, 5% hexa, 2% sodium chloride ("NaCl"), and 5% $ZnSO_4$. Sample B was a soy protein isolate modified with 5% SSS, 3% sodium borate, 5% hexa, 1% methacrylic anhydride ("MAA"), and 5% $ZnSO_4$. Sample C was a soy protein isolate modified with 5% SSS, 3% sodium borate, 5% hexa, 1% citric acid monohydrate ("citric acid"), and 5% $ZnSO_4$. The wood specimens were prepared and tested in accordance with the methods of Example 1.

The results can be seen in Table 5, below.

TABLE 5

| Sample | Shear Strength | | |
|---|---|---|---|
| | Unsoaked Sample | Soaked Sample | Wet Strength |
| A | 5.9 ± 0.33 CFW: 95 | 5.2 ± 0.45 CFW: 100 | 1.9 ± 0.73 CFW: 30 |
| B | 4.2 ± 0.22 CFW: 42 | 3.9 ± 0.19 CFW: 87 | 2.4 ± 0.27 CFW: 19 |
| C | 5.1 ± 0.41 CFW: 100 | 4.8 ± 0.22 CFW: 95 | 2.4 ± 0.10 CFW: 44 |

Discussion

The modification with NaCl, citric acid, and MAA were tested because modification of soy protein with zinc sulfate yields a high viscosity adhesive that is difficult to apply. The three modifications in this example were tested to determine whether the use of one of these chemicals to lower the viscosity of the adhesive would still serve to preserve its usefulness. The viscosity of all of the modified SPI adhesives improved significantly from the addition of NaCl, citric acid, and MAA. Sample C, the citric acid, showed the highest wood failure, but lower wet strength and wood failure than an adhesive without citric acid (e.g. Sample H of Example 1). The improvement from citric acid may be due to the many carboxyl groups that could interact with hydroxyl and amino groups of SPI to improve the adhesive strength.

EXAMPLE 3

This Example determined the effects of zinc sulfate application onto adhesives in accordance with the present invention.

Materials, Methods, and Results

A modified adhesive was prepared using the method of Example 1 using soy protein isolate modified with 5% SSS, 3% sodium borate, and 5% hexa. Three wood specimens were prepared using the Veneer cherry wood. Specimen A was prepared by applying the adhesive to one piece of a wood sample and 5% zinc sulfate solution to a second piece of a wood sample. The two samples were placed together after 15 minutes, and then pressed at 130° C. and 1.4 MPa for 5 minutes. Specimen B was prepared by applying the adhesive to two wood samples. After 15 minutes, zinc sulfate was sprayed onto one of the wood samples. The two samples were then assembled and pressed at 130° C. and 1.4 MPa for 5 minutes. Specimen C was prepared by applying the adhesive to two wood samples. After 15 minutes, zinc sulfate was sprayed onto both of the wood samples. The two samples were then assembled and pressed at 130° C. and 1.4 MPa for 5 minutes. After preparation, the three specimens were tested in the manner described in Example 1, and the results of these tests are reproduced in Table 6, below.

TABLE 6

| Sample | Shear Strength | | Wet Strength |
| --- | --- | --- | --- |
| | Unsoaked Sample | Soaked Sample | |
| A | 4.4 ± 0.35 | 3.8 ± 0.57 | 1.8 ± 0.48 |
| | CFW: 77 | CFW: 81 | CFW: 17 |
| B | 5.2 ± 0.56 | 4.8 ± 0.32 | 2.7 ± 0.21 |
| | CFW: 91 | CFW: 96 | CFW: 42 |
| C | 5.1 ± 0.47 | 4.7 ± 0.35 | 3.2 ± 0.49 |
| | CFW: 99 | CFW: 96 | CFW: 60 |

Discussion

Because of the increased viscosities of soy adhesives modified with zinc sulfate, these experiments were performed to observe performance of the adhesive without zinc sulfate modification by spraying zinc sulfate solution on the wood in addition to applying the adhesive. The specimen prepared by applying adhesive first and then a 5% zinc sulfate solution prior to assembly (Sample C) had the best performance. Its performance is comparable to that of Sample H in Example 1.

EXAMPLE 4

This Example tested the effects of epoxidized soybean oil in adhesives in accordance with the present invention.

Materials, Methods, and Results

Three adhesive samples were prepared as follows. For Sample A, 0.36 g expoxidized soybean oil ("ESO") was added to 30 g of a 1% sodium dodecyl sulfate (SDS) solution. Then 3.6 g of SPI was added to the ESO-SDS solution and stirred for about 2 hours. To the resulting solution was added 5% SSS, 3% sodium borate, and 5% zinc sulfate. For Sample B, about 3.6 g of SPI was suspended in 30 g distilled water and stirred for 2 hours. Then 5% SSS was added and stirred for about five minutes. About 0.36 g ESO was dissolved in 2 g acetone, then added to the SPI-SSS-water mixture. 3% sodium borate and 5% zinc sulfate were then added to the mixture and stirred for about five minutes. Sample C was prepared in the manner similar to Sample B except that ESO was dissolved in ethanol. After preparation, the three specimens were tested in the manner described in Example 1, and the results of these tests are reproduced in Table 7, below.

TABLE 7

| Sample | Shear Strength | | Wet Strength |
| --- | --- | --- | --- |
| | Unsoaked Sample | Soaked Sample | |
| A | 4.9 ± 0.52 | 4.1 ± 0.27 | 1.8 ± 0.19 |
| | CFW: 72 | CFW: 93 | CFW: 14 |
| B | 5.1 ± 0.40 | 4.3 ± 0.44 | 1.8 ± 0.25 |
| | CFW: 48 | CFW: 70 | CFW: 8 |
| C | 4.5 ± 0.86 | 4.3 ± 0.42 | 1.4 ± 0.14 |
| | CFW: 73 | CFW: 76 | CFW: 14 |

Discussion

ESO contains epoxy groups that were expected to react with some amino groups from the SPI in order to improve water resistance of the modified SPI adhesives. Additionally, three different solvents were used with the ESO including 1% SDS, acetone, and ethanol. However, the results did not match the initial expectation, as the strength and wood failure of all three adhesives in this example were lower than that of SPI modified solely by SSS and zinc sulfate (Sample D, Example 1).

EXAMPLE 5

Five adhesive samples, all containing 5% SSS, 3% sodium borate, 5% 1,2,7,8-diepoxyoctane ("DEO"), and 5% zinc sulfate, were prepared as follows: Sample A was prepared by suspending 3.6 g SPI in 30 g distilled water with 1% citric acid and then stirred for about 2 hours. The pH of the resulting slurry was then adjusted to 7.0 using 1N NaOH solution. The 5% SSS, 3% sodium borate, 5% DEO, and 5% zinc sulfate were added to the slurry respectively, and the composition was stirred for five minutes after each chemical addition. Sample B was prepared by dissolving 0.18 g tricarballylic acid ("TCA") into 30 g distilled water. The resulting solution was stirred for 2 hours, and its pH was adjusted to 7.0 using 1N NaOH solution. The remaining ingredients were then added as in Sample A. Sample C was prepared by adding sorbitol and 3.6 g SPI to 30 g of distilled water such that the concentration of sorbitol was about 5% compared to the SPI. The resulting solution was stirred for 2 hours, and its pH was adjusted to 7.0 using 1N NaOH solution. Then, the remaining ingredients were added as in the previous samples. Sample D was prepared by adding polyvinyl alcohol ("PVA") and 3.6 g SPI to 30 g of distilled water such that the concentration of PVA was about 5% compared to the SPI. The resulting solution was stirred for 2 hours, and its pH was adjusted to 7.0 using 1N NaOH solution before adding the other ingredients in the same manner as the earlier samples. Sample E was prepared by adding bleach and 3.6 g SPI to 30 g of distilled water such that the concentration of bleach was about 10% compared to the SPI. The resulting solution was stirred for 2 hours, and its pH was adjusted to 7.0 using 1N NaOH solution. Again, the other ingredients were added in the same fashion. After preparation, the five specimens were tested in the manner described in Example 1, and the results of these tests are reproduced in Table 8 below.

TABLE 8

| Sample | Shear Strength | | |
|---|---|---|---|
| | Unsoaked Sample | Soaked Sample | Wet Strength |
| A | 5.2 ± 0.48 | 4.8 ± 0.27 | 2.3 ± 0.45 |
| | CFW: 100 | CFW: 99 | CFW: 48 |
| B | 6.0 ± 0.26 | 4.9 ± 0.58 | 2.2 ± 0.38 |
| | CFW: 100 | CFW: 100 | CFW: 52 |
| C | 5.4 ± 0.32 | 4.9 ± 0.13 | 2.0 ± 0.17 |
| | CFW: 100 | CFW: 100 | CFW: 30 |
| D | 4.9 ± 0.31 | 4.5 ± 0.28 | 1.6 ± 0.16 |
| | CFW: 96 | CFW: 98 | CFW: 40 |
| E | 5.1 ± 0.48 | 4.7 ± 0.38 | 1.9 ± 0.31 |
| | CFW: 98 | CFW: 94 | CFW: 43 |

Discussion

DEO contains epoxy groups that were speculated to have reaction potential with some amino groups of SPI. PVA and Sorbitol contain hydroxyl groups and were used for comparison purposes. TCA contains three carboxyl groups per molecule that were expected to react with hydroxyl and amino groups of SPI. Bleach was used as an alkaline and oxidizing agent to increase hydrolysis and the unfolding degree of SPI. Citric acid was used to improve adhesive viscosity. All of the adhesives performed similarly, but none of them showed superior performance to Sample H from Example 1.

EXAMPLE 6

This Example tested modified lab soy protein isolates.

Materials, Methods, and Results

Soy protein was prepared by adding commercial soy flour (Cargill, Minneapolis, Minn.) to distilled water at a 1:15-1:20 ratio, and subsequently stirred until the dry flour dissolved completely. The pH of the mixture was then adjusted to 7.6 with 1N NaOH and stirred for 120 minutes. The mixture was centrifuged at 4° C. at 12,000 g for 20 minutes. The pH of the supernatant was then adjusted to 4.5 with 2N HCl, stirred for about five minutes, and stored at 4° C. for 24 hours. The resulting mixture was then centrifuged at 4° C. at 12,000 g for 20 minutes. The supernatant was discarded and the preciptiation was dissolved in distilled water at pH 7.6, then was freeze dried and milled into powder as lab soy protein isolates ("LSPI"). The LSPI had about 82% protein content, 5.1% moisture content (w.b.), 0.012% lipid content and 3.8% ash content.

Four adhesive samples were prepared as follows. Sample A was prepared by dissolving 1.2 g of LSPI in 10 g distilled water, which was stirred for 2 hours. This produced slurry with a pH of about 7.4. Sample B was prepared in the same manner as sample A, and then 5% SSS, 3% sodium borate, and 5% zinc sulfate were respectively added to the resulting slurry. Sample C was prepared by adding 1.2 g LSPI to 10 g 1% citric acid solution, which was then stirred for two hours, and the pH of the slurry was then adjusted to 7.1 using 1N NaOH solution. To make sample D, 0.7% NaH$_2$PO$_2$ was then added to slurry identical to sample C. The pH of the slurry was then adjusted to 7.1 using 1N NaOH solution.

Wood specimens were then prepared in the same manner as Example 1, except that they were pressed at 170° C. The specimens were then tested in the manner described in Example 1, and the results of these tests are reproduced in Table 9 below.

TABLE 9

| Sample | Shear Strength | | |
|---|---|---|---|
| | Unsoaked Sample | Soaked Sample | Wet Strength |
| A | 3.7 ± 0.40 | 3.1 ± 0.32 | 0.7 ± 0.22 |
| | CFW: 26 | CFW: 24 | CFW: 5 |
| B | 5.2 ± 0.73 | 5.2 ± 0.23 | 1.6 ± 0.28 |
| | CFW: 85 | CFW: 95 | CFW: 16 |
| C | 5.1 ± 0.55 | 4.6 ± 0.36 | 1.6 ± 0.55 |
| | CFW: 94 | CFW: 92 | CFW: 30 |
| D | 4.9 ± 0.56 | 4.5 ± 0.39 | 2.1 ± 0.26 |
| | CFW: 94 | CFW: 78 | CFW: 45 |

Discussion

Modified LSPI had a much higher adhesive strength and water resistance than LSPI. The LSPI modified with citric acid and NaH$_2$PO$_2$ (sample D) had a higher wet strength and wood failure than the LSPI modified with SSS, sodium borate, and zinc sulfate (sample B).

EXAMPLE 7

This Example compared freeze-dried and oven-dried adhesives at different pH levels.

Materials, Methods, and Results

This example used LSPI prepared as described in Example 6 which was then freeze dried or oven dried at 55° C., then suspended in distilled water at about 14% LSPI content and stirred for 20 minutes or until a homogenous slurry was obtained. Ten slurries were prepared in this manner to create adhesive samples. Sample A was adjusted to a pH of 3.6 using 1N HCl. Sample B was adjusted to a pH of 4.6 using 1N HCl. Sample C was adjusted to a pH of 5.6 using 1N HCl. Sample D was adjusted to a pH of 6.6 using 1N HCl. Sample E was adjusted to a pH of 9.6 using 1N NaOH. Samples A-E were prepared from the freeze dried LSPI. Samples F-J were prepared in the same manner as Samples A-E, except that Samples F-J were prepared from the oven dried (at 55° C.) LSPI instead of being freeze dried.

Wood specimens were then prepared as described in Example 1, except that the wood sample was 5 mm in thickness, the press temperature was about 180° C., and the press time was for 10 minutes. The specimens were then tested in the manner described in Example 1, except that the soaking time was 96 hours. The results of these tests are reproduced in Tables 10 and 11, below.

TABLE 10

| Sample | Shear Strength | | |
|---|---|---|---|
| | Unsoaked Sample | Soaked Sample | Wet Strength |
| A | 7.2 | 7.1 | 3.3 |
| B | 6.9 | 6.2 | 3.5 |
| C | 7.4 | 7.6 | 3.4 |
| D | 7.2 | 7.3 | 2.6 |
| E | 5.0 | 4.8 | 1.6 |

TABLE 11

| Sample | Shear Strength | | |
|---|---|---|---|
| | Unsoaked Sample | Soaked Sample | Wet Strength |
| F | 8.2 | 7.6 | 3.0 |
| G | 6.7 | 6.2 | 3.1 |
| H | 6.6 | 6.7 | 2.7 |
| I | 7.1 | 7.3 | 2.6 |
| J | 6.8 | 7.0 | 1.7 |

Discussion

Differences in pH had no effect on the dry or soaked strength of the LSPI adhesives, but significantly affected wet strength. The wet strength of LSPI was reduced at pH values equal to or above 6.6. Oven dried LSPI and freeze dried LSPI had similar adhesive strengths.

EXAMPLE 8

This Example presented the effects of citric acid together with pH variation and $NaH_2PO_2$ on adhesives in accordance with the present invention.

Materials, Methods, and Results

Eight adhesive samples were prepared as follows. For each sample, 1.2 g of LSPI prepared in the same manner as in Example 6 was suspended in 10 grams of 1% citric acid solution and stirred for two hours or until a homogenous slurry was obtained. Sample A was adjusted to a pH of 2.0 using 1N HCl. Sample B was adjusted to a pH of 4.4 using 1N HCl. Sample C was adjusted to a pH of 7.0 using 1N HCl and/or 1N NaOH. Sample D was adjusted to a pH of 10.2 using 1N NaOH. Sample E was adjusted to a pH of 12.1 using 1N NaOH. Samples F and G were additionally modified with 0.7% $NaH_2PO_2$. Samples F-H were all adjusted to a pH of 4.4 using 1N HCl.

Wood specimens were then prepared in the same manner as Example 1, except that they were pressed at 170° C. for Samples A-F and at 190° C. for Samples G-H. The specimens were then tested in the manner described in Example 1, and the results of these tests are reproduced in Tables 12 and 13 below.

TABLE 12

| Sample | Shear Strength | | |
|---|---|---|---|
| | Unsoaked Sample | Soaked Sample | Wet Strength |
| A | 4.6 ± 0.64 CFW: 96 | 4.6 ± 0.39 CFW: 96 | 1.9 ± 0.15 CFW: 30 |
| B | 5.5 ± 0.43 CFW: 100 | 5.8 ± 0.64 CFW: 100 | 3.1 ± 0.37 CFW: 48 |
| C | 5.1 ± 0.55 CFW: 94 | 4.6 ± 0.36 CFW: 92 | 1.6 ± 0.55 CFW: 30 |
| D | 4.4 ± 0.59 CFW: 81 | 4.2 ± 0.37 CFW: 74 | 1.1 ± 0.62 CFW: 22 |
| E | 3.8 ± 0.57 CFW: 50 | 3.4 ± 0.61 CFW: 48 | 1.3 ± 0.29 CFW: 9 |

TABLE 13

| Sample | Shear Strength | | |
|---|---|---|---|
| | Unsoaked Sample | Soaked Sample | Wet Strength |
| F | 6.1 ± 0.21 CFW: 100 | 5.6 ± 0.37 CFW: 100 | 2.9 ± 0.42 CFW: 46 |
| G | 5.9 ± 0.11 CFW: 100 | 5.6 ± 0.21 CFW: 100 | 3.6 ± 0.28 CFW: 73 |

TABLE 13-continued

| Sample | Shear Strength | | |
|---|---|---|---|
| | Unsoaked Sample | Soaked Sample | Wet Strength |
| H | 5.9 ± 0.38 CFW: 100 | 6.0 ± 0.48 CFW: 100 | 3.6 ± 0.62 CFW: 76 |

Discussion

The LSPI modified with 1% citric acid at pH 4.4 (Sample B) gave the highest adhesive strength and wood failure, and is comparable to the performance of Sample H from Example 1. Since the method and components used in Sample B of this Example are much simpler and less expensive than those used in Sample H of Example 1, this is an encouraging development. Additionally, LSPI samples at a pH of 4.4 that were pressed at 190° C. demonstrated higher wet strength and wood failure. This may be because higher temperatures enhance interaction and reaction between carboxyl groups from citric acid with hydroxyl and amino groups from proteins.

EXAMPLE 9

This Example compared adhesives in accordance with the present invention with conventional UF and PF resins.

Materials, Methods, and Results

Two adhesive samples were prepared as follows. Sample A was prepared by modifying LSPI, which was made in the same manner as described in Example 6, with 1% TCA in the manner described in Example 5. Sample B was prepared by suspending 1.2 g LSPI (which was also made in the same manner as described in Example 6) in 10 g of 1% citric acid solution, which was then stirred for two hours or until a homogenous slurry was obtained. 5% hexa (based on the weight of the soy protein) was then added to the resulting slurry. For comparison purposes, Sample C was a conventional phenolformaldehyde adhesive, and Sample D was a conventional urea formaldehyde adhesive.

The pH of both samples (A and B) was adjusted to 4.3 with 1N HCl solution. Wood specimens were prepared in the same manner as Example 8. The press temperature was 170° C. and 1.4 MPa for 5 minutes with an assembly time of 15 minutes for Samples A and B, and 160° C. and 1.4 MPa for 5 minutes with an assembly time of 10 minutes for Samples C and D. The results of these tests are reproduced in Tables 14 and 15, below.

TABLE 14

| Sample | Shear Strength | | |
|---|---|---|---|
| | Unsoaked Sample | Soaked Sample | Wet Strength |
| A | 5.6 ± 0.55 CFW: 100 | 5.7 ± 0.45 CFW: 100 | 3.1 ± 0.55 CFW: 64 |
| B | 6.2 ± 0.68 CFW: 100 | 6.2 ± 0.49 CFW: 100 | 3.6 ± 0.12 CFW: 76 |

TABLE 15

| | Shear Strength | | |
|---|---|---|---|
| Sample | Unsoaked Sample | Soaked Sample | Wet Strength |
| C | 5.4 ± 0.57 CFW: 100 | 5.4 ± 0.6 CFW: 100 | 3.6 ± 0.55 CFW: 77 |
| D | 5.0 ± 0.54 CFW: 99 | 4.5 ± 0.49 CFW: 96 | 3.4 ± 0.54 CFW: 62 |

Discussion

LSPI modified with both TCA and hexa/citric acid had comparable adhesive performance with phenol and urea formaldehyde resins. LSPI modified with hexa and citric acid had higher wet strength and wood failure than LSPI modified with TCA. Hexa is an aldehyde compound that acts as a cross linker and probably improves the water resistance of the adhesive by interacting with the LSPI proteins.

EXAMPLE 10

This example tested the effects of carboxyl methyl cellulose ("CMC") on adhesives in accordance with the present invention.

Materials, Methods, and Results

Three adhesive samples were prepared as follows. Sample A was prepared by suspending 1.2 g LSPI, prepared using the same methods as the previous examples, in 10 g of 1% citric acid solution containing 0.5% CMC. The solution was stirred for two hours or until a homogenous slurry was obtained. 5% hexa based on the weight of the soy protein was then added and the pH was adjusted to 4.3 with 1N HCl solution. Samples B and C were prepared in the same manner as Sample A, however, the amount of CMC was increased to 0.8% and 1.0%, respectively for these samples.

Wood specimens were prepared in the same manner as in Example 6 (170° C. at 1.4 MPa press pressure for 5 minutes with an assembly time of 15 minutes) and tested in the same manner as in Example 1. The results of these tests are reproduced in Table 16 below.

TABLE 16

| | Shear Strength | | |
|---|---|---|---|
| Sample | Unsoaked Sample | Soaked Sample | Wet Strength |
| A | 5.1 ± 0.42 CFW: 100 | 5.3 ± 0.39 CFW: 100 | 3.2 ± 0.27 CFW: 50 |
| B | 5.3 ± 0.19 CFW: 100 | 5.8 ± 0.42 CFW: 100 | 3.5 ± 0.17 CFW: 62 |
| C | 5.6 ± 0.5 CFW: 100 | 5.7 ± 0.48 CFW: 100 | 3.4 ± 0.08 CFW: 68 |

Discussion

The proteins prepared in examples 8 and 9 with a pH of 4.4 had a tendency to precipitate after a short period of time, thereby requiring stirring to maintain a uniform distribution of protein molecules in the mixture. To improve protein suspension, CMC was added to the adhesive for this example. The CMC did, in fact, improve protein suspension, and did so without any significant effect on the adhesive performance.

EXAMPLE 11

This Example determined the effects of boiling on the performance of adhesives in accordance with the present invention.

Materials, Methods, and Results

Four adhesive samples were prepared as follows: Sample A was unmodified LSPI. Sample B was prepared with LSPI and citric acid at a pH of 4.4, as described in Example 6. For comparison purposes, two control adhesive samples were also used. Sample C was prepared with LSPI, citric acid, and hexa at a pH of 4.3 as described in Example 9. Sample D used a phenol formaldehyde resin as described in Example 9. Wood specimens, labeled A-D according to which adhesive was used, were prepared for each of the adhesive formulations identically with how they were prepared for the earlier examples.

Five additional wood specimens were prepared using the four adhesives prepared above and a fifth conventional UF adhesive. These specimens were labeled E-I with E-H receiving the respective adhesive prepared above and specimen I receiving the conventional UF adhesive. These wood specimens differed from those above in that they were assembled as 3-piece specimens, rather than the 2-piece specimens used for A-D. To prepare the 3-piece specimens, three cherry wood samples with dimensions of 152 mm×83 mm×3 mm were assembled by placing a middle wood sample between two side wood samples. The side pieces were oriented so that their grain was parallel to each other. The middle piece was oriented so that its grain ran perpendicular to that of the side pieces. The adhesive sample was brushed onto one side of the two side pieces, and both sides of the middle piece. The three pieces were assembled after 15 minutes and then pressed at 170/190° C. and 0.71/1.4 MPa for 7 minutes using a hot press. After all of the wood specimens were prepared, a boiling test was conducted following the PS 1-95 method. One group of specimens was placed in a tank of boiling water, separated by wire screens in such a manner that all surfaces were freely exposed to water. The specimens were immersed at least 51 mm deep during the boiling test cycle for four hours. The specimens were then dried for 20 hours at 63±3° C. with sufficient air circulation to reduce the moisture content of the specimens to about the original moisture content. The four hour boiling cycle was repeated, then the specimens were removed and cooled in running tap water at about 18-27° C. for 1 hour. The specimens were then evaluated for wet strength and wood failure following the procedures of Example 1. The results of these evaluations are reproduced in Tables 17 for the two piece wood samples, and 18 for the 3-piece wood samples, below.

TABLE 17

| | Delamination % For Boiling Test | | | |
|---|---|---|---|---|
| Sample | 1st Boiling Cycle | Drying 20 h | 2nd Boiling Cycle | Wet Strength |
| A | 20 | 40 | 90 | 0.3 CFW: 0 |
| B | 0 | 0 | 0 | 1.8 ± 0.32 CFW: 50 |
| C | 0 | 0 | 0 | 2.2 ± 0.25 CFW: 60 |
| D | 0 | 0 | 0 | 3.5 ± 0.39 CFW: 78 |

TABLE 18

Delamination % For Boiling Test on 3-Piece Samples

| Sample | 1st Boiling Cycle | Drying 20 h | 2nd Boiling Cycle | Wet Strength |
|---|---|---|---|---|
| E | 20 | 50 | 70 | |
| F | 0 | 40 | 50 | 0.4 ± 0.31 |
| G | 0 | 20 | 40 | 0.7 ± 0.47 |
| H | 0 | 0 | 0 | 2.3 ± 0.23 CFW: 73 |
| I | 100 | 100 | 100 | |

Discussion

As shown in Table 17, the modified soy protein adhesives are much stronger than unmodified soy proteins, but weaker than conventional phenolformaldehyde adhesives in both wet strength and wood failure. For the 3-piece wood specimen samples, the wet strength and wood failure degree of the specimens with modified soy protein significantly decreased compared to the corresponding 2-piece specimens, although they all performed better than Example I in Table 18 (the UF resin). Due to orienting the wood fibers in opposite directions, stress caused wood swelling during the boiling process would have a more significant impact on strength and wood failure than in the corresponding 2-piece specimens.

EXAMPLE 12

This Example tested the effects of vacuum-pressure aging on adhesives in accordance with the present invention.

Materials, Methods, and Results

Three adhesive samples were prepared in the following manner. Sample A was prepared by modifying LSPI, prepared as in the previous examples, with 1% citric acid, 5% hexa, and 0.8% CMC and adjusting the pH to 4.3 using the method described in Example 10. Sample B was prepared by modifying LSPI, prepared as in the previous examples, with 1% citric acid, 5% hexa, and 5% zinc sulfate and adjusting the pH to 4.3. Sample C was prepared by dissolving LSPI, prepared as in the previous examples, in distilled water with a solid content of 14%. The pH of the resulting slurry was adjusted to 4.6. For comparison purposes, three control adhesive samples were also used. Sample D is an unmodified LSPI, prepared as in Example 6. Sample E was a phenol formaldehyde resin (PF 5101), prepared in accordance with Example 9, and Sample F was a conventional urea formaldehyde (UF) resin, prepared in accordance with Example 11.

For each sample, a 3-piece cherry wood sample was prepared in the same manner as in Example 11 such that there was about 1.5 mg/cm$^2$ protein solid concentration on the wood surface. For specimens using the LSPI adhesives, the three pieces were assembled after 15 minutes and pressed at 170° C. and 1.4 MPa for 5 minutes. For specimens using the PF and UF resins, the press temperature was 160° C. and 1.4 MPa for 5 minutes with an assembly time of 10 minutes. All pressing used a Model 3890 Auto "M"press (Carver Inc., Wabash, Ind.). Wood specimens were preconditioned at 23° C. and 50% relative humidity for 48 hours and then sent to Georgia Pacific Resin Inc. (Decatur, Ga.) for testing and evaluation.

The testing performed at Georgia Pacific followed the PS1-95 method. One group of specimens was placed in a pressure vessel and separated by wire screens in such a manner that all surfaces were freely exposed to water. The specimens were weighted down and the vessel filled with water such that all specimens were immersed at least 51 mm deep in the water. A vacuum pressure of at least 84.4 kPA was drawn and maintained for 30 minutes. The vacuum was released and followed immediately with a second vacuum pressure of 517 i 14 kPa for 30 minutes. After the second vacuum pressure was released, the specimens were removed from the vessel and evaluated for wet strength and wood failure. The data reported below in Table 19 was the average of 5 samples.

TABLE 19

Pressure-Vacuum Aging Test

| Sample | Wet Strength (MPa) | Wood Failure |
|---|---|---|
| A | 2.5 | CFW 34 |
| B | 2.7 | CFW 48 |
| C | 3.0 | CFW 37 |
| D | 1.4 | CFW 8 |
| E | 2.5 | CFW 66 |
| F | 2.7 | CFW 91 |

Discussion

The modified LSPI had a much higher wet strength and wood failure than the unmodified LSPI. The modified LSPI also had similar wet strength as conventional phenolformaldehyde adhesives and conventional urea formaldehyde adhesives, but had a lower wood failure.

EXAMPLE 13

This Example tested the viscosities of selected protein adhesives.

Materials, Methods, and Results

Adhesives from modified commercial soy proteins and lab produced soy proteins were combined with various modifiers and tested for viscosity. All modification procedures are the same as previously described in earlier Examples. Unmodified soy proteins and PF (GP 5101) resin were also evaluated. Some adhesive preparations were dried in an air oven at 55° C. and milled into powder. Prior to testing, these preparations were redissolved in water. These preparations are referred to in the results as the "heat-treated" adhesive. The "untreated" adhesive merely refers to the fact that the adhesive was used without any drying step. Viscosities of the selected adhesives were determined using a Brookfield programmable Rheometer (DV-III+) (Brookfield Engineering Laboratories, Inc., Middleboro, Mass.) equipped with a SC4-21/13R adaptor for small sample sizes at room temperature (24° C.) and a shearing rate of 1.40 s-1.

In FIG. 1, GP5101 refers to conventional phenol formaldehyde resin, SPI-C refers to commercial soy protein isolates, SPI-L refers to lab soy protein isolates, SSS refers to 5% sodium silicate solution, Borax refers to 5% sodium borate, Hexa refers to 5% hexamethylenetertramine, CA refers to 1% citric acid monohydrate prepared as in the previous Examples, and CMC refers to carboxyl methyl cellulose. The SPI content was 12%. The percentage of SSS was based on SPI slurry weight while all other chemical percentages were based on SPI solid weight.

As shown by FIG. 1, the soy protein adhesives modified with zinc sulfate (SPI-C+SSS+ZnSO$_4$) was very viscous and had a much higher viscosity than the PF resin. The addition of sodium borate reduced the viscosity but it was still comparatively high. Citric acid addition further improved (reduced) the viscosity (SPI-C+SSS+sodium borate+ZnSO$_4$), yet the viscosity was still double that of PF resin. Similarly modified lab-produced SPI had lower viscosity than commercial SPI and modified soy adhesive that was heat treated had lower viscosity and was easier to use. As shown by Table 20, lab soy protein adhesive modified with citric acid and/or hexa at a pH of 4.4 had similar viscosities (100 mPa), which were much lower than that of CMC-modified adhesives.

TABLE 20

Viscosities of selected soy protein adhesives

| Sample | Viscosity (mPa s) |
|---|---|
| LSPI + 1% Citric acid monohydrate pH = 4.4 | 100 |
| LSPI + 1% CA + 5% hexamethylentertramine pH - 4.4 | 100 |

EXAMPLE 14

This Example determined the effects of polyamide-epichlorohydrin ("PAE") and pH on adhesives in accordance with the invention.

Materials, Methods, and Results

SPI containing 88.3% (dry basis) protein and 5% moisture was extracted from defatted soybean flour 100/90 (Cargill, Cedar Rapids, Iowa). Slurry of this SPI was made by suspending 12 g of the SPI powder in 100 ml distilled water at room temperature and stirring until a homogenous slurry was obtained. The SPI was modified with PAE by adding the PAE drop by drop until the concentration of PAE was 5%, based on the dry weight of the SPI. The PAE was obtained from Hercules Inc., (Wilmington, Del.) as Kymeme 557H aqueous solution that is 12.5% by weight PAE, having a density of 1.03 g/cm$^3$, and a pH of 4.6 to about 4.9. Seven samples were then prepared from the PAE-modified SPI by adjusting the pH using 2N HCl or 2N NaOH as follows. Sample A was adjusted to a pH of 3.5. Sample B was adjusted to a pH of 4.3. Sample C was adjusted to a pH of 5.0. Sample D was adjusted to a pH of 5.5. Sample E was adjusted to a pH of 6.0. Sample F was adjusted to a pH of 7.1. Sample G was adjusted to a pH of 10.0.

Five additional samples were prepared to determine the effects of PAE variance. Sample H was left unmodified. Sample I was modified with PAE with a concentration of 3% compared to the dry weight of the soy protein. Sample J was modified with PAE to 5%. Sample K was modified with PAE to 10%. Sample L was modified with PAE to 15%. The pH of each of these samples was adjusted to 7.1.

The samples were then evenly brushed onto one end of two pieces of a piece of cherry-veneer (127 mm×50mm) for each sample until the entire area was completely wetted (about 2.5±0.3 mg/cm$^2$ protein solid concentration). The area of application on each end was 127 mm×20 mm. Each of the two sample pieces was allowed to stand at room temperature for 10 minutes. The wood sample pieces were then assembled and pressed at 170° C. and 1.4 Mpa for 5 minutes using a Hot Press. (Model 3890 Auto "M", Carver Inc., Wabash, Ind.).

Figure 2:
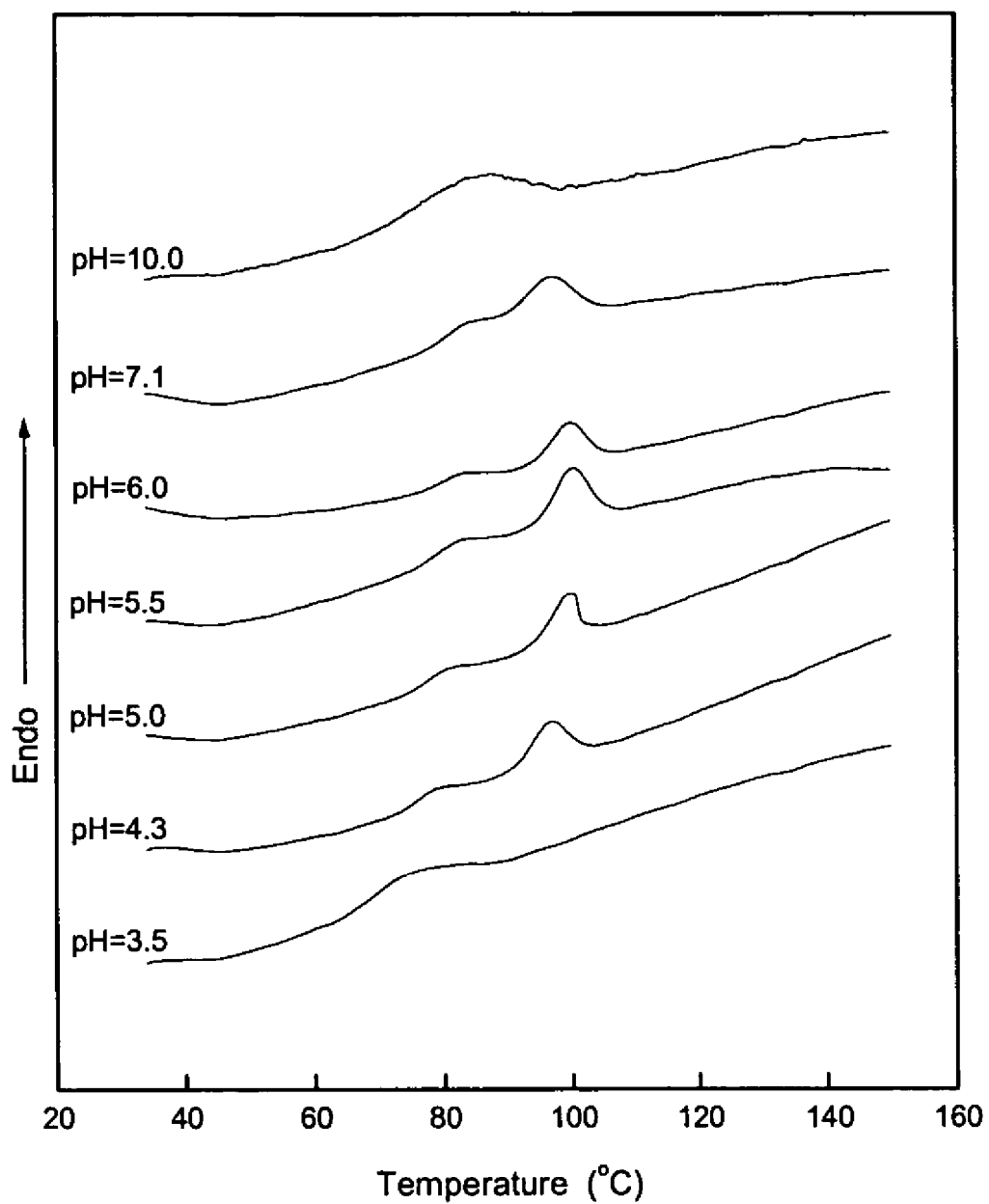
FIG. 2 is a graph illustrating the DSC thermographs of PAE-modified adhesives at varying pH levels in accordance with the present invention.

The thermal properties of each sample A-K were determined using a Perkin-Elmer Pyris-1 Differential Scanning Calorimeter ("DSC") (Perkin-Elmer, Norwalk, Conn.). The instrument was calibrated with indium and zinc standards before measurements, and all measurements were conducted in a nitrogen atmosphere. All samples were held at 20° C. for 1 minute and then were scanned to 150° C. at 10° C./minute. The samples were then quenched to 20° C., held for 1 minute, and scanned again to 150° C. at 10° C./minute. The denaturation temperature ("$T_d$") and enthalpy of denaturation ("$\Delta H_d$") were obtained from the first scan. A DSC thermograph for these samples is provided in FIG. 2. In the pH range of 4.3 to 7.1, the DSC thermographs gave two endothermic transitions caused by the denaturation of 11S and 7S, respectively. However, at pH 10.0 and pH 3.5, only one broad denaturation peak was observed, indicating the SI denatured partially at both extreme basic or acidic conditions. Additionally, $\Delta H_d$ peaked in value at 9.27 J/g at pH 7.1, thereby indicating that SPI denatured partially at both extreme basic or acidic conditions. The thermal properties of various concentrations of PAE-modified SPI adhesives were affected by PAE. As PAE content increased, both $T_d$ and $\Delta H_d$ increased, thereby indicating that the structure of soy protein was stabilized by the formation of the PAE-SPI complex. Soy protein has a typical globular structure, and most of the hydrophobic residues were embedded while most of the hydrophillic residues were exposed on the outside. Therefore, cationic groups of PAE would bind to exposed anion carboxyl groups of SPI to form some kind of a coating. Furthermore, the ionic complexation interaction between PAE and SPI might provide an additional stabilizing force for the soy protein structure, thereby improving its heat resistance.

The rheological properties of the PAE-modified SPI adhesives were determined using a Brookfield programmable rheometer (DV-III+) equipped with a Small Sample Adapter (SC4-21/13R) (Brookfield Engineering Laboratories, Inc., Middleboro, Mass.). The samples were transferred into the sample holder of the rheometer, and the rheological properties were recorded against shear rate at 25° C. and 93.0 s$^{-1}$.

The results of the above tests are recorded in Table 21, below.

TABLE 21

| Sample | Denaturation Temperature (° C.) | | Denaturation Enthalpy $\Delta H_d$ (J/g SPI) | Viscosity (mPa * s) |
|---|---|---|---|---|
| | $T_d 1$ | $T_d 2$ | | |
| A | 73.1 | — | 5.04 | 19.0 |
| B | 77.3 | 94.9 | 6.66 | 5.7 |
| C | 79.1 | 97.7 | 7.25 | 7.3 |
| D | 81.1 | 98.3 | 8.91 | 7.3 |
| E | 81.4 | 97.9 | 8.06 | 18.7 |
| F | 81.7 | 94.8 | 9.27 | 33.0 |
| G | 82.3 | — | 8.43 | 18.0 |
| H | 75.6 | 91.8 | 9.01 | 11.3 |
| I | 81.0 | 93.3 | 9.23 | 11.3 |
| J | 81.7 | 94.8 | 9.27 | 33.0 |
| K | 82.6 | 95.7 | 10.07 | 12.0 |
| L | 82.6 | 95.5 | 11.05 | 7.7 |

From these results, the viscosity of the 5% PAE-modified adhesives appears to be pH dependent with the minimum viscosity of the PAE-SPI adhesives being observed between pH levels 5.5 to 4.3. The viscosity increased at pH 3.5 or below or between 6.0 and 7.1. However, the viscosity decreased again as the pH increased from 7.1 to 10.0. The minimum viscosity at the pH range of 5.5 to 4.3 is due to the precipitation at this point. At the other pHs, the precipitate dissolved, resulting in increased viscosity. Viscosity decreased again at pH of 10.0 as a consequence of the denaturation of the SPI. Viscosity of the PAE-SPI adhesives was affected by many factors including isoelectric precipitation, denaturation and complexation.

The viscosity of the PAE-modified SPI adhesives was also shown to be dependent on PAE concentration, At pH 7.1, the adhesive with 5% PAE had the highest viscosity. As noted above, PAE binds to the exposed carboxyl groups of SPI to form a coating, which might increase the diameter of the soy protein globular structure, and hence, increase the viscosity. As PAE concentration increases, however, more precipitation would occur at pH 7.1, resulting in reduced viscosities for adhesives with higher PAE levels. However, too much PAE significantly precipitates SPI at pH 7.1, thereby reducing viscosity.

To test the shear strength of the samples, the cherry plywood assemblies were preconditioned at 23° C. and 50% RH for 48 hours and then were cut into five 20 mm wide specimens. These were conditioned further for 5 days in a conditioning room at 23° C. and 50% RH. The specimens were then prepared and tested according to ASTM D 2339. An Instron universal testing machine (Model 4465, Canton, Mass.) with a crosshead speed of 1.6 mm/min was used. The shear strength at maximum load was recorded; each value presented was the mean of five specimens, and marked as unsoaked control shear strength. Failure mode and percentage of wood failure of the test specimens was also determined by observation with the naked eye and with the aid of a magnifier.

Figure 3:
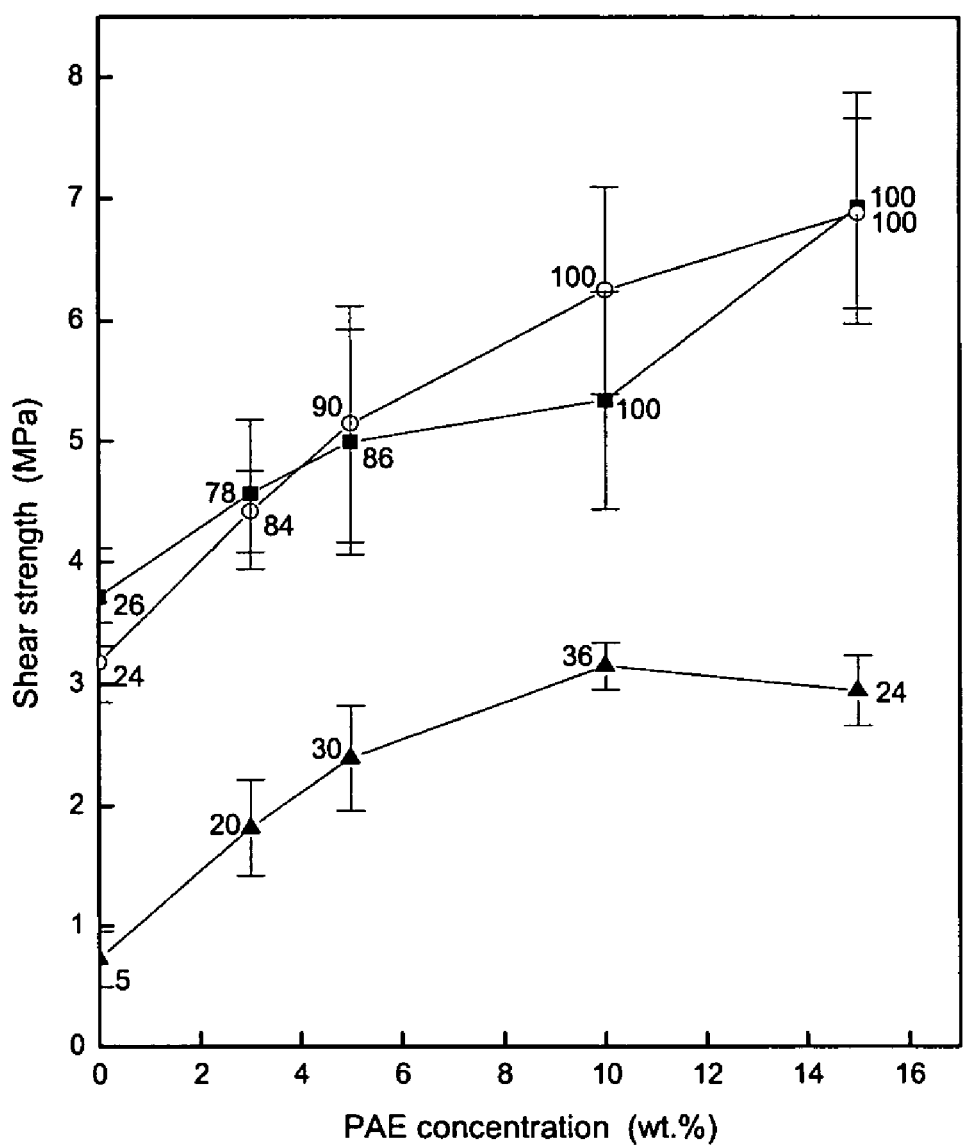
FIG. 3 is a graph illustrating the effects of PAE concentration on shear strengths of unsoaked, soaked, and wet wood specimens.

Water resistance of the samples was performed according to ASTM D 1183 and D 1151. 10 of the 20 mm wide specimens for each set of conditions were soaked in tap water at 23° C. for 48 hours. Then five of the specimens were taken out and dried at 23° C. and 50% RH for 5 days. The shear strength was tested as described above and marked as soaked shear strength. The other five specimens were taken out and tested immediately as described above, and marked as wet shear strength. These results are shown in FIGS. 3 (PAE concentration variance) and 4 (pH variance). The data beside the symbols in FIGS. 3 and 4 indicates the average percentage of wood failure.

FIG. 3 demonstrates that as the PAE concentration increased, the shear strength increased sharply at first before tapering off. The soaked shear strength was not significantly different from the unsoaked shear strength, thereby indicating that all of the bond forces were recovered after drying. However, the wet shear strength was much lower. The percentage of wood failure for the unmodified SPI adhesives was also very low. The percentage of wood failure increased sharply after PAE modification with the unsoaked and soaked samples bonded with 10% or 15% PAE-modified adhesive having 100% wood failure. The wet cherry plywood bonded wtih 10% PAE-modified adhesive had 36% wood failure. Accordingly, it is clear that the PAE modification greatly improved the performance of the SPI adhesives.

Figure 4:
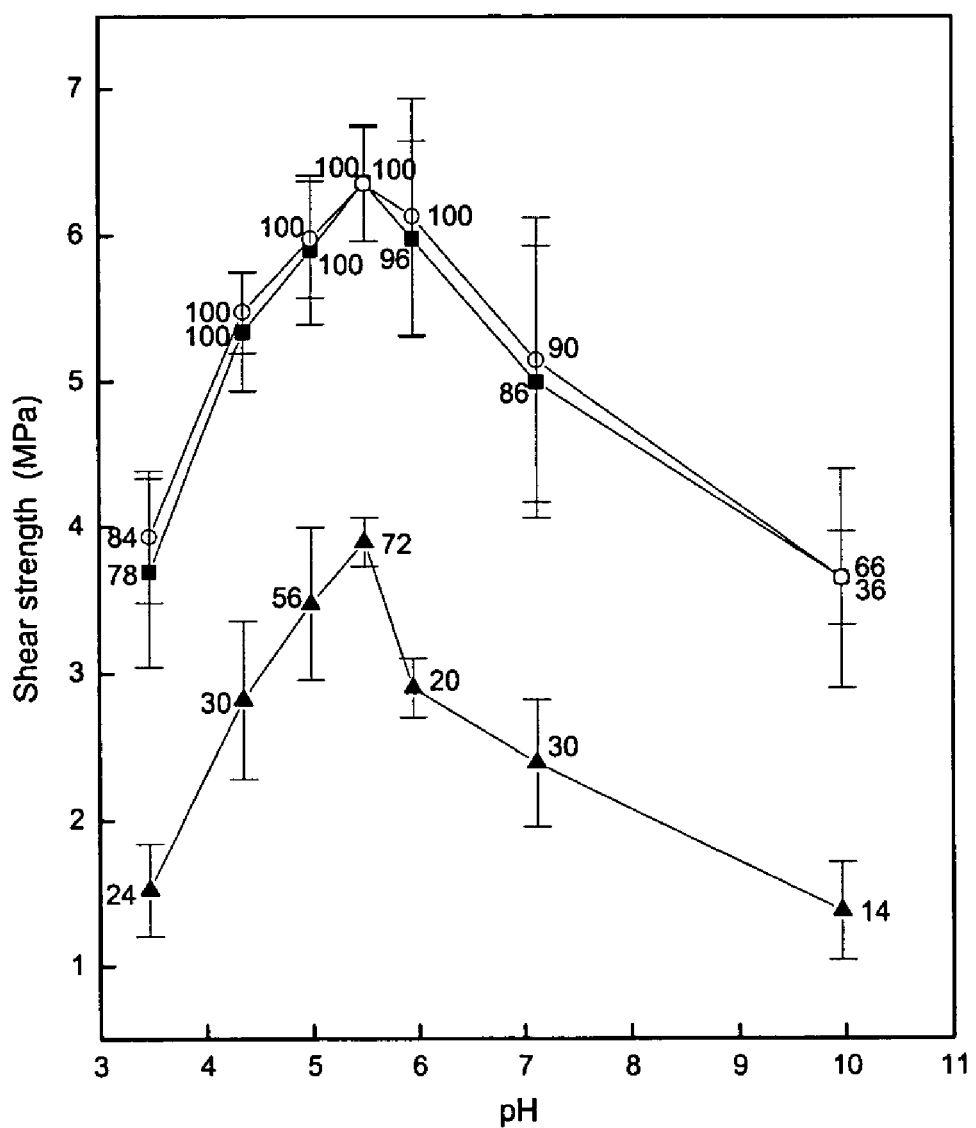
FIG. 4 is a graph illustrating the effects of pH variance on the strength of PAE-modified adhesives in accordance with the present invention.

The change in pH values also affected the adhesion strength of the adhesives, as seen in FIG. 4. The shear strengths increased greatly as pH increased to 5.5, then decreased sharply as pH further increased. The percentage of wood failure had the same variation against pH. Surprisingly, the cherry plywood bonded with 5% PAE-modified SPI adhesive at a pH of 5.5 reached a high wet strength value of 3.9 MPa with a wood failure of 72%.

Four additional adhesive samples were prepared in accordance with the methods described in Example 13. Sample A was an unmodified SPI at a pH of 7.1. Sample B was an unmodified SPI at a pH of 4.5. Sample C used SPI modified with 5% PAE at a pH of 7.1. Sample D used SPI modified with 5% PAE at a pH of 5.5. Wood specimens were prepared and tested as described above in this Example. Additionally, boiling tests of these samples were carried out according to ASTM D 5572. 5 of the 20 mm wide specimens for each set of conditions were soaked in boiling water for 4 hours, then dried at 63° C. for 20 hours. The specimens were boiled again for 4 hours, then cooled in running water at room temperature for 1 hour. The specimens were removed from the water and their shear strength and percentages of delamination were immediately tested as described above. Results for this testing are provided in Table 22.

TABLE 22

| Sample | Adhesion Strength (MPa) | | | |
| --- | --- | --- | --- | --- |
| | Unsoaked | Soaked | Wet | Boiling |
| A | 3.71 ± 0.40 | 3.18 ± 0.33 | 0.73 ± 0.23 | 0.31 |
| | CFW: 26% | CFW: 24% | CFW: 5% | 80% delaminated |
| B | 5.36 ± 0.21 | 4.83 ± 0.38 | 2.84 ± 0.22 | 1.79 ± 0.32 |
| | CFW: 100% | CFW: 100% | CFW: 100% | CFW: 50% |
| C | 4.99 ± 0.93 | 5.14 ± 0.98 | 2.39 ± 0.43 | 0.64 ± 0.46 |
| | CFW: 86% | CFW: 90% | CFW: 30% | 60% delaminated |
| D | 6.36 ± 0.40 | 6.35 ± 0.39 | 3.90 ± 0.17 | 2.60 ± 0.37 |
| | CFW: 100% | CFW: 100% | CFW: 72% | CFW 64% |

Turbidity was determined for SPI-PAE samples at various pH and PAE levels. To measure turbidity, a 0.1 wt % SPI Tris-solution was prepared by dissolving SPI powder in 10 mM Tris solution (Fisher Scientific, Pittsburgh, PA). A desired amount of PAE aqueous solution (0 wt %, 3 wt %, 5 wt %, 10 wt %, and 15 wt %) was then added drop by drop and white precipitates were formed. Next, 2N NaOH solution was added to adjust the pH to 10-11 or until the slurry became clear. After that, the slurry was adjusted to various pH levels with HCl solution before measuring the absorbance at 600 nm with a Hitachi U-2010 spectrophotometer (Hitachi, Inc., Tokyo, Japan). For the 15 wt % PAE-modified SPI, 0.05 wt % SPI solution was used instead of 0.1 wt %. The turbidity results are provided in FIG. 5.

Discussion

Figure 5:
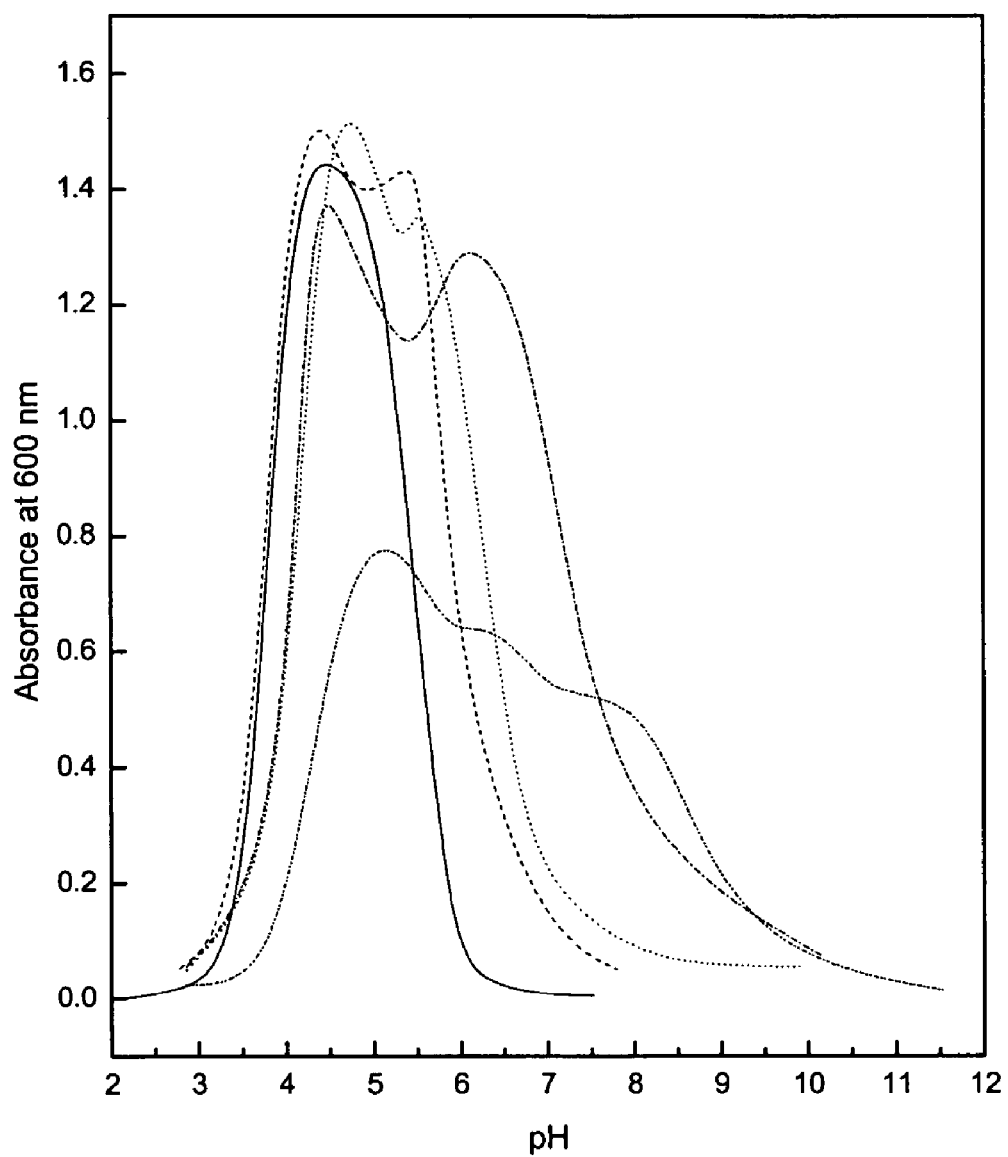
FIG. 5 is a graph illustrating the absorbance profiles of PAE-modified adhesives in accordance with the present invention.

In looking at this Example, it is noted that SPI has a typical isoelectric point ("pI") of 4.5, at which negatively charged groups are balanced with positively charged groups, and the SPI has a net charge of zero. At its pI, the SPI precipitates. At a pH lower than pI, the SPI bears a net positive charge, and the positively charged SPI repels each other and dissolves in water. Similarly, the SPI bears a net negative charge at pH above the pI. The SPI solution had a pH of about 7.2 and it was clear. However, precipitation was observed immediately after the addition of PAE (pH=7.1 at 5% PAE). Interestingly, that reaction was reversible by adjusting the pH to above 9 or below 4, respectively. To study this phenomenom, the turbidity of the PAE-SPI slurry was measured at various pH levels. As shown by FIG. 5, the SPI had a maximum absorbance at around pH 4.5, which corresponds to the pI of the SPI. With the addition of PAE, two peaks appeared with one having a fixed location at about pH 4.5 and the other varying with the PAE concentration from pH 5.4 for 3 wt % PAE, to pH 6.1 for 10 wt % PAE. Additionally, the peaks broadened with the addition of PAE and the precipitate appeared in a wider pH range. For the 15 wt % PAE-SPI slurry, the peak was too broad to determine peak location accurately.

Figure 6:
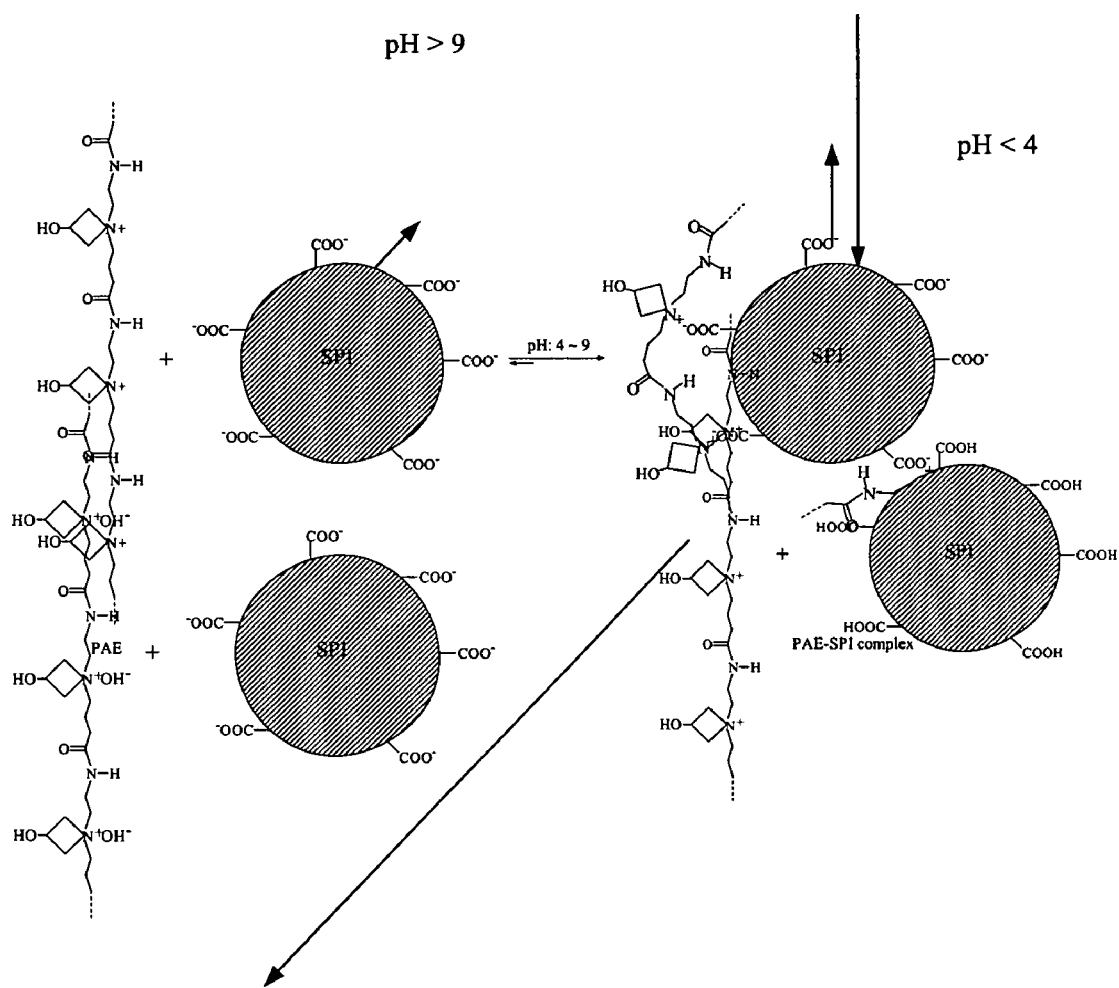
FIG. 6 is a schematic diagram of the formation and disassociation of an PAE-SPI interpolymer complex.

PAE is a cationic polymer. After addition to an SPI solution (pH~7), the cationic portion of PAE interacts with the anionic carboxyl group of SPI to for PAE-SPI complexes. This interaction is schematically illustrated in FIG. 6. In looking at the results of this Example, it must be remembered that at pH~7, SPI has a net negative charge. Although PAE solution has a pH of about 4.6~4.9, incorporation of a small amount of PAE into SPI solution would not significantly change the pH of the SPI. It has been reported that PAE could react with active hydrogen groups to form covalent bonds. However, such reactions would probably not happen at room temperature and/or under the short time frame conditions of this experiment because the turbid PAE-SPI slurry became clear when pH was adjusted to extremely basic (pH>9) or extremely acidic (pH<4) conditions. The driving force for the PAE-SPI complex was ionic interaction, and the complex formation was reversible upon a pH change. When the pH was adjusted to 9 or above, abundant anionic $OH^-$ groups in the adhesive slurry would bind to the cationic group of PAE to release PAE from the PAE-SPI complex, thereby dissolving both components. When the pH was adjusted to below 4, carboxyl groups ($COO^-$) of SPI would bind to proton ions ($H^+$) to form COOH groups and release SPI from the PAE-SPI complex, thereby dissolving both components. At low PAE concentrations, there were not enough PAE molecules to react with SPI, thereby resulting in the first peak around pH 4.5 due to the free SPI molecules. Other peaks in FIG. 5 resulted from the PAE-SPI complex formation and pH dependence.

Figure 7:
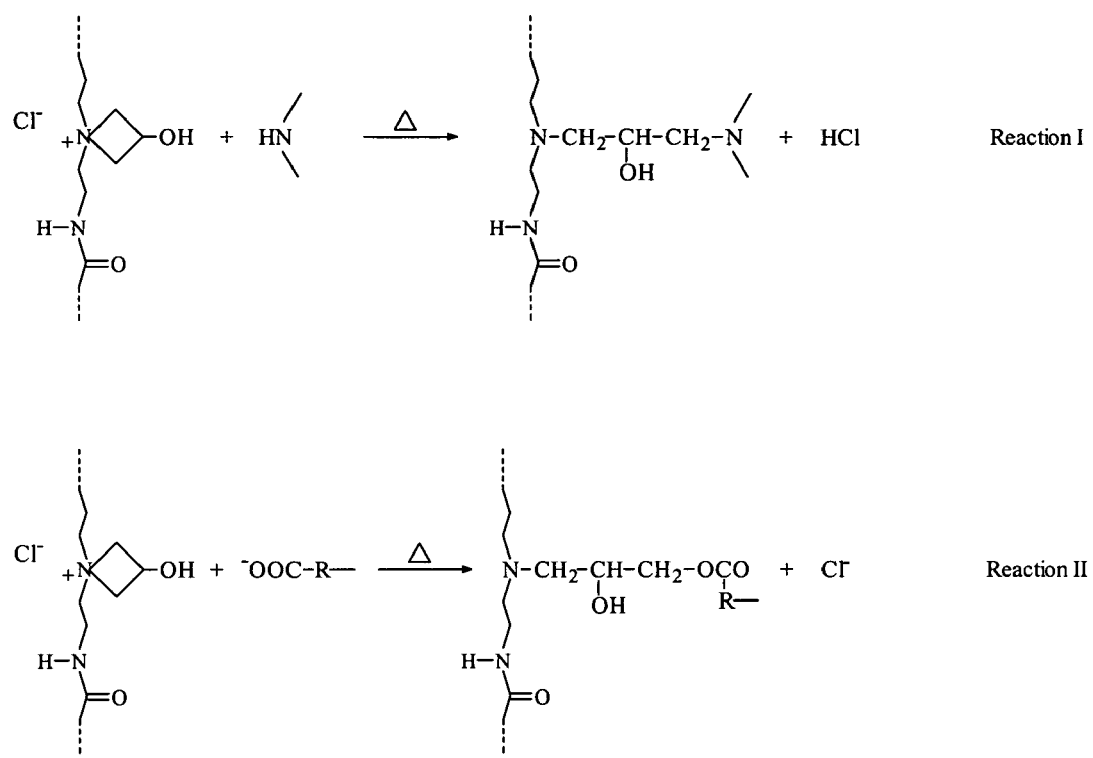
FIG. 7 is a schematic diagram of the chemical reactions between azetidinium groups of PAE and the primary and secondary amines and carboxyl groups.

As previously noted, PAE forms a complex with SPI through ionic interactions at room temperature. Because both PAE and SPI are macromolecules and have multifunctional groups, the complexation interactions might act as a kind of physical cross-linking between them. During the hot-press processing, chemical cross-linking reactions between PAE and SPI might also occur. PAE has a reactive azetidinium group, which is a four-member ring. The azetidinium group is not stable and can react with groups having active hydrogen. At elevated temperatures, the azetidinium group could react with primary and secondary amines, and carboxyl groups (FIG. 7) although it does not easily react with hydroxyl groups. Reaction I might happen between the azetidinium groups and the secondary amines of PAE, which is a self-crosslinking reaction. Reaction I might also occur between the azetidinium groups and the primary and secondary amines of SPI. Reaction II might occur between the azetidinium groups and the carboxyl groups of SPI, and it might also happen between the azetidinium groups and the carboxyl groups of wood fibers. Both the ionic complexation interactions and the chemical reactions contributed to the performance enhancement of the PAE-modified SPI adhesives. Those reactions had three main functions: (a) the self-crosslinking reaction and the chemical and physical reactions between PAE and SPI formed an insoluble three-dimension network, which thereby improved the strength and water resistance of the adhesive itself; (b) the reactions between PAE and wood fibers provided additional linkages between the adhesive and wood substrate; and (c) the above reactions and formed linkages might reduce water penetration into the interfacial layer between the wood and the adhesive. It was, therefore, understandable that the adhesion properties increased as PAE concentration increased. However, very high PAE content might interfere with interactions between SPI and wood substrate, and hence the adhesion properties leveled off or increased slightly at PAE concentrations of 10~15% (FIG. 3). Unmodified SPI adhesive had a maximum adhesion strength and water resistance at its pI, i.e. pH 4.5 (Table 22). This was attributed to the special structure and conformation of SPI at its pI. For the 5% PAE-modified SPI adhesives, the maximum values shifted to pH 5.5 (FIG. 4). The highly dependent nature of pH on the ionic complexation interactions (FIGS. 5 and 6) and the resultant special structure/conformation of the complexes should play a key role on this shift. At pH 5.5, the complexation interactions were mostly enhanced as shown by the peak in FIG. 5. Additionally, the PAE-modified SPI had the lowest net charge at pH 5.5, which greatly reduced the water resistance.

Although pH also affects the chemical reactions of PAE with amino groups and carboxyl groups (FIG. 7), this dependence does not contribute much at low pH values. In the paper industry, the PAE is most often used in a pH range of 6~8. It has also been reported that PAE could not react with neutral carboxyl groups (RCOOH) and protonated amino groups ($RNH_3^+$) and imino groups ($R_2NH_2^+$). As pH decreased, amino groups of SPI were protonated (the histidine has the lowest pK of 6.5 for the positively charged amino acids), and the amount of the anionic carboxylate groups ($RCOO^-$) decreased, and hence efficiency of the chemical reactions (FIG. 7) decreased. Therefore, the ionic complexation interactions should be the main factor influencing the pH-dependence of the adhesion properties.

This discussion might also suggest that the complexation interactions play a key role on the improvement of adhesion properties at pH<6, and the chemical reactions play a key role at pH>9 because the complexes disassociated at high pH (FIG. 6). Moreover, in the pH range of 6~9, both complexation and chemical reactions are important.

Table 22 compared the adhesion properties between the unmodified and the 5% PAE-modified SPI adhesives. It can be seen that the unmodified SPI adhesive had low strength and water resistance. The PAE-modification improved the adhesion properties, and the change of pH to 5.5 further enhanced the adhesion performance. The 5% PAE-modified SPI adhesive still had low water resistance, a property best exhibited by the boiling test results. However, the change of pH to 5.5 greatly improved the water resistance the PAE-modified SPI adhesive.

The PAE and SPI molecules formed reversible complexes at room temperature through ionic interactions between the cationic azetidinium groups of PAE and the anionic carboxyl groups of SPI. The PAE-SPI complex disassociated at basic conditions (pH>9) or extreme acidic conditions (pH<4). The complexes formed some kind of coating on SPI globulin. Formation of the complex stabilized the SPI structure, and increased its denaturation temperature and enthalpy. At elevated temperatures, the PAE and SPI molecules could form covalent bonds through chemical reactions between the azetidinium groups of PAE and the primary and secondary amines and carboxyl groups of SPI. PAE could also react with itself and wood fibers. The PAE-modification greatly improved properties of the SPI-based adhesives. The complexation interactions were the main reason for the improvement of adhesion properties at low pH while chemical reactions were the main reason at high pH. The PAE-modified SPI provides a water-resistant, environmentally friendly wood adhesive mainly from renewable resources.

The teachings and content of the following references are hereby incorporated by reference.

1. Freedom Group, Adhesives to 2004—Market Size, Market Share, Demand Forecast and Sales; freedoniagroup.com/adhesives
2. U. Kalapathy, N. S. Hettiarachchy, D. Myers and M. A. Hanna, *J. Am. Oil Chem. Soc.* 72, 507-510 (1995).
3. N. S. Hettiarachchy, U. Kalapathy and D. Myers, *J. Am. Oil Chem. Soc.* 72, 1461-1467 (1995).
4. U. Kalapathy, N. S. Hettiarachchy, D. Myers and K. C. Rhee, *J. Am. Oil Chem. Soc.* 73, 1063-1066 (1996).
5. S. X. Sun and K. Bian, *J. Am. Oil Chem. Soc.* 76, 977-980 (1999).
6. W. Huang and X. Sun, *J. Am. Oil Chem. Soc.* 77, 101-104 (2000).
7. W. Huang and X. Sun, *J. Am. Oil Chem. Soc.* 77, 705-708 (2000).

8. J. Rogers, X. Geng and K. Li, *Wood and Fiber Sci.* 36, 186-194 (2004).
9. X. Mo, X. Sun and D. Wang, *J. Am. Oil Chem. Soc.* 81, 395-400 (2004).
10. Z. Zhong, X. S. Sun, X. Fang and J. A. Ratto, *J. Adhesion Sci. Technol.* 15, 1417-1427 (2001).
11. Z. Zhong, X. S. Sun, X. Fang and J. A. Ratto, *Intl. J. Adhesion &Adhesives* 22, 267-272 (2002).
12. K. Li, S. Peshkova and X. Geng, *J. Am. Oil Chem. Soc.* 81, 487-491(2004).
13. H. H. Espy, in: *Wet-Strength Resins and Their Application*, L. L. Chan (Ed), Ch. 2, pp. 13-61. TAPPI Press, Atlanta (1994).
14. N. Dunlop-Jones, in: Paper Chemistry, J. C. Roberts (Ed), Ch. 7, pp. 98-119. Blackie Academic & Professional, New York (1996).
15. H. H. Espy and T. W. Rave, *Tappi J.* 71, 133-137 (1988).
16. H. H. Espy, *Tappi J.* 78, 90-99 (1995).
17. ASTM D 2339, in: *Annual Book of ASTM Standards, Vol.*15.06, pp. 144-146. American society for Testing and Materials, Philadelphia, Pa. (1995).
18. ASTM D 1183, in: *Annual Book of ASTM Standards, Vol.* 15.06, pp. 65-67. American society for Testing and Materials, Philadelphia, Pa. (1992).
19. ASTM D 1151, in: *Annual Book of ASTM Standards, Vol.* 15.06, pp. 68-69. American society for Testing and Materials, West Conshohocken, Pa. (2000).
20. ASTM D 5572, in: *Annual Book of ASTM Standards, Vol.* 15.06, pp.442-455. American society for Testing and Materials, Philadelphia, Pa. (1994).

We claim:

1. An adhesive composition comprising:
    a solids content of 5-20%;
    a protein portion;
    an ingredient portion wherein said ingredient is selected from the group consisting of carboxyl-containing compounds, aldehyde-containing compounds, epoxy group-containing compounds, and mixtures thereof; and
    a pH near the isoelectric point of said protein.
2. The composition of claim 1, said protein portion comprising up to 99% of said composition.
3. The composition of claim 1, said ingredient portion comprising between about 0.5 to 20% of said composition.
4. The composition of claim 1, said protein portion being selected from the group consisting of corn protein and fractions thereof, wheat protein and fractions thereof, soy protein and fractions thereof, and combinations thereof.
5. The composition of claim 1, said ingredient portion comprising between about 0.5 to 10% of said carboxyl-containing compound.
6. The composition of claim 1, said ingredient portion comprising between about 1 to 10% of said aldehyde-containing compound.
7. The composition of claim 1, said ingredient portion comprising between about 1 to 15% of said epoxy-containing compound.
8. The composition of claim 1, said ingredient portion being selected from the group consisting of sodium silicate solution, hexamethylenetramine, carbon disulfide, sodium borate, zinc salts such as $ZnSO_4$, copper salts such as $CuSO_4$, epoxy resins, PAE, epoxidized soybean oil, acids such as citric acids, carboxy methyl cellulose, tricarballylic acid, and bases.
9. The composition of claim 1, said pH being between about 3.6 to 6.5.
10. A composition comprising;
    a solids content of 5-20%:
    a protein portion; and
    a carboxyl group containing portion.
11. The composition of claim 10, said protein portion comprising up to 99% or said solids content of said composition.
12. The composition of claim 10, said carboxyl group portion comprising between about 0.5 to 20% of said composition.
13. The composition of claim 10, said protein portion being selected from the group consisting of corn protein and fractions thereof, wheat protein and fractions thereof, soy protein and fractions thereof, and combinations thereof.
14. The composition of claim 10, said carboxyl group containing portion comprising between about 0.5 to 10% of said carboxyl-containing compound.
15. The composition of claim 10, said composition having a pH near the isoelectric point of said protein.
16. A method of preparing an adhesive composition having a solids content of 5-20% comprising the steps of:
    combining a protein portion, water, and an ingredient portion to form said composition, said ingredient portion being selected from the group consisting of carboxyl-containing compounds, aldehyde-containing compounds, epoxy group-containing compounds, and mixtures thereof to form said adhesive composition; and
    adjusting the pH of said composition to be near the isoelectric point of said protein.
17. The method of claim 16, said protein portion comprising up to 99% of said solids content of said composition.
18. The method of claim 16, said ingredient portion comprising between about 0.5 to 20% of said composition.
19. The method of claim 16, said ingredient portion comprising between about 0.5 to 10% of said carboxyl-containing compound.
20. The method of claim 16, said ingredient portion being selected from the group consisting of sodium silicate solution, hexamethylenctramine, carbon disulfide, sodium borate, zinc salts such as $ZnSO_4$, copper salts such as $CuSO_4$, epoxy resins, PAE, epoxidized soybean oil, acids such as citric acids, carboxy methyl cellulose, tricarballylic acid, and bases.
21. A method of forming an adhesive composition having a solids content of 5-20% comprising the steps of;
    selecting a protein and a carboxyl group containing compound;
    combining said protein and said carboxyl group containing compound to form said composition.
22. The method of claim 21, said protein comprising up to 99% of said solids content of said composition.
23. The method of claim 21, said carboxyl group containing compound comprising between about 0.5 to 20% of said composition.
24. The method of claim 21, further including the step of adjusting the pH of said composition to be near the isoelectric point of said protein.

\* \* \* \* \*